United States Patent
Hashiguchi et al.

(10) Patent No.: US 11,826,913 B2
(45) Date of Patent: Nov. 28, 2023

(54) CONTROL SYSTEM, ROBOT SYSTEM AND CONTROL METHOD

(71) Applicant: KABUSHIKI KAISHA YASKAWA DENKI, Kitakyushu (JP)

(72) Inventors: Yukio Hashiguchi, Fukuoka (JP); Yoshifumi Onoyama, Fukuoka (JP)

(*) Notice: Subject to any disclaimer, the term of this patent is extended or adjusted under 35 U.S.C. 154(b) by 189 days.

(21) Appl. No.: 17/361,323

(22) Filed: Jun. 29, 2021

(65) Prior Publication Data

US 2022/0001537 A1 Jan. 6, 2022

Related U.S. Application Data

(60) Provisional application No. 63/046,701, filed on Jul. 1, 2020.

(30) Foreign Application Priority Data

Oct. 16, 2020 (JP) ................. 2020-174853

(51) Int. Cl.
*B25J 9/16* (2006.01)
*B25J 13/00* (2006.01)

(52) U.S. Cl.
CPC ........... *B25J 9/1671* (2013.01); *B25J 9/1676* (2013.01); *B25J 9/1682* (2013.01)

(58) Field of Classification Search
CPC ........ B25J 9/1674; B25J 9/161; B25J 9/1612; B25J 13/00; B25J 9/1671; B25J 9/1676;

(Continued)

(56) References Cited

U.S. PATENT DOCUMENTS 10,792,810 B1 * 10/2020 Beckman ................. B25J 9/163
2004/0225484 A1 11/2004 Hamann
(Continued)

FOREIGN PATENT DOCUMENTS

EP 2829932 A2 * 1/2015 ............. G05B 15/02
EP 3363604 8/2018
(Continued)

OTHER PUBLICATIONS

Extended Search Report in corresponding European Application No. 21181526.1 dated Nov. 22, 2021.
(Continued)

*Primary Examiner* — Adam R Mott
*Assistant Examiner* — Heather J Keniry
(74) *Attorney, Agent, or Firm* — SOEI PATENT & LAW FIRM

(57) ABSTRACT

A control system includes: a controller configured to operate one or more robots in a real space based on an operation program; and circuitry configured to: operate one or more virtual robots based on the operation program in a virtual space, the one or more virtual robots corresponding to the one or more robots respectively; cause the controller to suspend an operation based on the operation program by the one or more robots; simulate a suspended state of the real space after suspension of the operation by the one or more robots, in the virtual space; and resume at least a part of the operation by the one or more virtual robots based on the operation program, in the virtual space in which the suspended state of the real space has been simulated.

21 Claims, 26 Drawing Sheets

(58) Field of Classification Search
CPC ......... B25J 9/1682; G05B 2219/39014; G05B 2219/40096; G05B 2219/40205; G05B 2219/40298; G05B 2219/40317; G05B 2219/40333; G05B 2219/40516
See application file for complete search history.

(56) References Cited

U.S. PATENT DOCUMENTS

| | | | |
|---|---|---|---|
| 2005/0071048 | A1 | 3/2005 | Watanabe et al. |
| 2006/0009878 | A1 | 1/2006 | Kobayashi et al. |
| 2006/0276934 | A1* | 12/2006 | Nihei .................. B25J 9/1679 700/245 |
| 2016/0075019 | A1 | 3/2016 | Tabuchi et al. |
| 2016/0136815 | A1 | 5/2016 | Linnell et al. |
| 2017/0227945 | A1 | 8/2017 | Wang et al. |
| 2017/0232614 | A1* | 8/2017 | Takeda ................ B25J 9/1676 703/7 |
| 2018/0079078 | A1 | 3/2018 | Nagatsuka et al. |
| 2018/0164788 | A1 | 6/2018 | Shimamura et al. |
| 2018/0224841 | A1 | 8/2018 | Tani et al. |
| 2018/0264649 | A1 | 9/2018 | Ojima et al. |
| 2019/0308322 | A1 | 10/2019 | Nishitani et al. |
| 2020/0249654 | A1* | 8/2020 | Edwards ............... G05B 19/414 |
| 2020/0276708 | A1* | 9/2020 | Shah ........................ B25J 19/04 |
| 2020/0376675 | A1* | 12/2020 | Bai ......................... H04N 23/90 |
| 2020/0398424 | A1* | 12/2020 | Hane ................... B25J 11/0065 |
| 2021/0053227 | A1* | 2/2021 | Wartenberg ............. B25J 9/163 |
| 2021/0078167 | A1* | 3/2021 | Khansari Zadeh ...... G06T 7/90 |
| 2021/0089040 | A1* | 3/2021 | Ebrahimi Afrouzi ........................ G05D 1/0248 |
| 2021/0122046 | A1* | 4/2021 | Sun ........................ B25J 9/1661 |
| 2021/0387350 | A1* | 12/2021 | Oleynik .................. A47J 44/00 |
| 2022/0072703 | A1 | 3/2022 | Hashiguchi et al. |

FOREIGN PATENT DOCUMENTS

| | | |
|---|---|---|
| JP | H2-257204 | 10/1990 |
| JP | H6-301412 | 10/1994 |
| JP | H7-044214 | 2/1995 |
| JP | H7-160323 | 6/1995 |
| JP | H7-200019 | 8/1995 |
| JP | 2002-318607 | 10/2002 |
| JP | 2004-038565 | 2/2004 |
| JP | 2005-103681 | 4/2005 |
| JP | 2005-316937 | 11/2005 |
| JP | 2006-343828 | 12/2006 |
| JP | 2016-059985 | 4/2016 |
| JP | 2017-102620 | 6/2017 |
| JP | 2018-051686 | 4/2018 |
| JP | 2018-097661 | 6/2018 |
| JP | 2018-153881 | 10/2018 |
| JP | 2019-504421 | 2/2019 |
| JP | 2019-209454 | 12/2019 |
| JP | 6658985 | 3/2020 |
| WO | 2017/136645 | 8/2017 |
| WO | 2019/064916 | 4/2019 |
| WO | 2020/234946 | 11/2020 |

OTHER PUBLICATIONS

Office Action issued in Japanese Patent Application No. P2020-140303, dated Jan. 5, 2021 (with English partial translation).
Office Action issued in Japanese Patent Application No. P2020-140303, dated May 11, 2021 (with English partial translation).
Office Action issued in Japanese Patent Application No. P2020-140307, dated Apr. 13, 2021 (with English partial translation).
International Search Report dated Aug. 31, 2021 for PCT/JP2021/021758.
International Search Report dated Aug. 10, 2021 for PCT/JP2021/021772.
International Preliminary Report on Patentability with Written Opinion dated Dec. 22, 2022 for PCT/JP2021/021758.
International Preliminary Report on Patentability with Written Opinion dated Dec. 22, 2022 for PCT/JP2021/021772.
SOEI Patent and Law Firm, Statement of Related Matters, dated Feb. 3, 2023.

* cited by examiner

*Fig.9*

| WORKPIECE | TASK 1 | TASK 2 | TASK 3 | TASK 4 | TASK 5 | ... |
|---|---|---|---|---|---|---|
| A | a1 | a2 | a3 | | | |
| B | b1 | b2 | b3 | b4 | b5 | |
| C | c1 | c2 | | | | |
| D | d1 | d2 | d3 | | | |
| E | e1 | e2 | e3 | e4 | | |
| ... | | | | | | |

Fig. 10

| DEVICE ID | STATUS PARAMETER 1 | STATUS PARAMETER 2 | STATUS PARAMETER 3 | STATUS PARAMETER 4 | ... | STATUS PARAMETER N |
|---|---|---|---|---|---|---|
| | | | | | | |
| | | | | | | |
| | | | | | | |
| | | | | | | |
| | | | | | | |
| | | | | | | |
| | | | | | | |

Fig.11

| TYPE | SERIAL NO. | POSITION |
|------|------------|----------|
|      |            |          |
|      |            |          |
|      |            |          |
|      |            |          |
|      |            |          |
|      |            |          |
|      |            |          |
|      |            |          |

# CONTROL SYSTEM, ROBOT SYSTEM AND CONTROL METHOD

CROSS-REFERENCE TO RELATED APPLICATION

This application is based upon and claims the benefit of priority from Japanese Patent Application No. 2020-174853, filed on Oct. 16, 2020, and U.S. Provisional Patent Application No. 63/046,701, filed on Jul. 1, 2020, the entire contents of which are incorporated herein by reference.

BACKGROUND

Field

The present disclosure relates to a control system, a robot system, and a control method.

Description of the Related Art

Japanese Unexamined Patent Application Publication No. 2019-209454 discloses a processing system including a processing apparatus for processing a workpiece and a robot for conveying the workpiece.

SUMMARY

Disclosed herein is an example control system. The control system may include: a controller configured to operate one or more robots in a real space based on an operation program; and circuitry configured to: operate one or more virtual robots based on the operation program in a virtual space, the one or more virtual robots corresponding to the one or more robots respectively; cause the controller to suspend an operation based on the operation program by the one or more robots; simulate a suspended state of the real space after suspension of the operation by the one or more robots, in the virtual space; and resume at least a part of the operation by the one or more virtual robots based on the operation program, in the virtual space in which the suspended state of the real space has been simulated.

Additionally, an example robot system is disclosed herein. the robot system may include: the above-described control system and the one or more robots.

Additionally, an example control method is disclosed herein. the control method may include: operating one or more robots in a real space based on an operation program; suspending an operation based on the operation program by the one or more robots; simulating a suspended state of the real space after suspension of the operation by the one or more robots in a virtual space; and resuming the operation by one or more virtual robots based on the operation program in the virtual space in which the suspended state of the real space is simulated.

BRIEF DESCRIPTION OF THE DRAWINGS

FIG. 9 is an example table showing an example of results of process assignment to workpieces.
FIG. 10 is an example table illustrating device information.
FIG. 11 is an example table illustrating workpiece information.

DETAILED DESCRIPTION

In the following description, with reference to the drawings, the same reference numbers are assigned to the same components or to similar components having the same function, and overlapping description is omitted.

Production System

Figure 1:
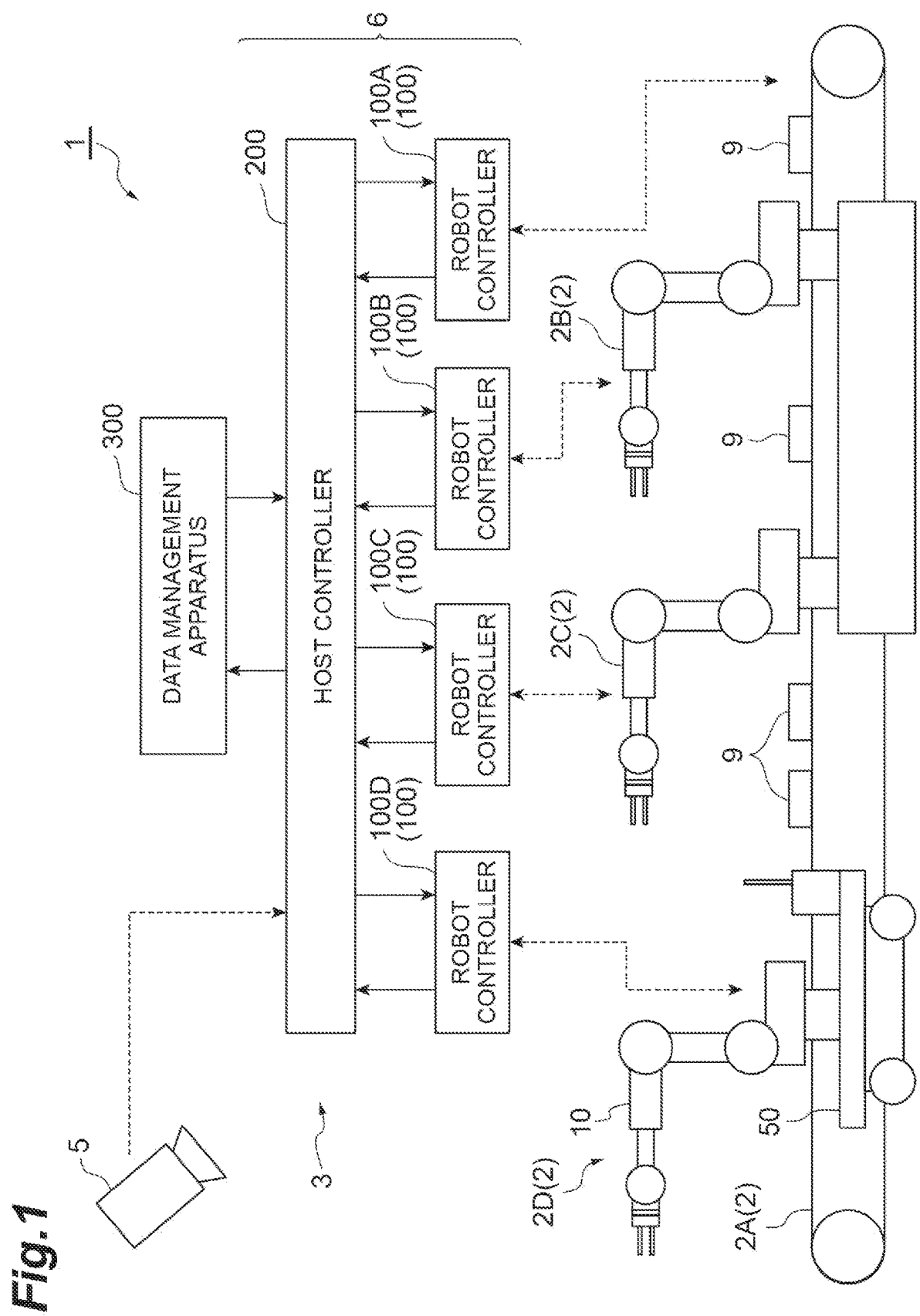
FIG. 1 is an example schematic diagram illustrating the configuration of a production system.

A production system 1 (robot system) shown in FIG. 1 is a system for producing workpieces. Hereinafter, all objects to be worked in the production process of the workpiece are referred to as "workpiece". For example, the "workpiece" includes a final product, a part of the final product, a unit combining a plurality of parts, and the like in the production system 1.

The production system 1 includes one or more local devices 2 and a control system 3. For example, the production system 1 includes a plurality of local devices 2, and the plurality of local devices 2 cooperate to produce a workpiece. The cooperative operation means that a plurality of local devices operate so as to share a plurality of steps for obtaining at least one final product. The plurality of local devices may operate to share a plurality of processes for obtaining one final product in units of processes, or may operate to share a plurality of processes for obtaining a plurality of final products in units of final products.

Each of the plurality of local devices 2 is a device that performs work directly on the workpiece 9 at the production site of the workpiece 9. The direct operation is, for example, an operation of applying some energy such as thermal energy, kinetic energy, or potential energy to the workpiece 9.

Each of the plurality of local devices 2 is, for example, an industrial machine. The plurality of local devices 2 include at least a robot (at least one local device 2 is a robot). The plurality of local devices 2 also include industrial machines that cooperate with the robot. Examples of the industrial machine that cooperates with the robot include an NC machine tool in addition to other robots.

The plurality of local devices 2 shown in FIG. 1 includes, but is not limited to, a transfer device 2A, robots 2B and 2C, and a mobile robot 2D. As long as at least one robot is included, the number and type of local devices 2 can be changed.

The transfer device 2A transfers the workpiece 9 using, for example, an electric motor or the like as a power source. Examples of the transfer device 2A include a belt conveyor and a roller conveyor. The robots 2B and 2C and the mobile robot 2D work on the workpiece 9 transferred by the transfer device 2A. Examples of the work for the workpiece 9 include assembling another workpiece 9 (for example, a sub-part) to the workpiece 9 (for example, a base part) transferred by the transfer device 2A, fastening (for example, bolting) and joining (for example, welding) parts in the workpiece 9 conveyed by the transfer device 2A, carrying the workpiece 9 into an NC machine tool installed around the transfer device 2A, and carrying the workpiece 9 out of the NC machine tool.

Figure 2:
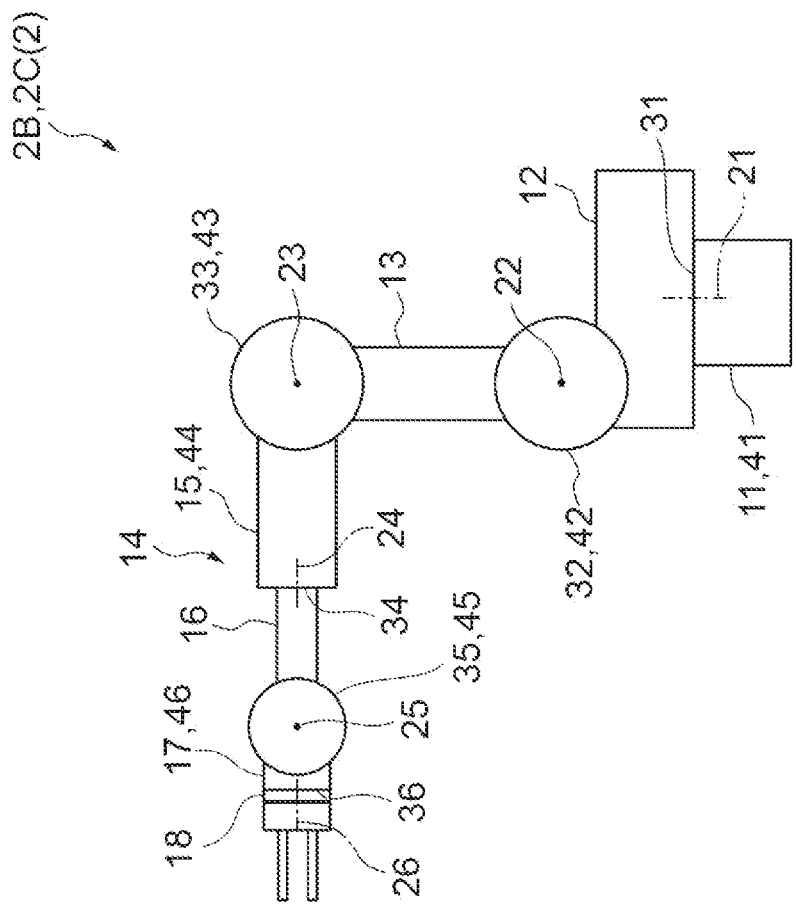
FIG. 2 is an example schematic diagram illustrating a configuration of a robot.

For example, the robots 2B and 2C are six-axis vertical articulated robots, and as shown in FIG. 2, have a base 11, a turning portion 12, a first arm 13, a second arm 14, a third arm 17, a tip portion 18, and actuators 41, 42, 43, 44, 45, and 46. The base 11 is installed around the transfer device 2A. Turning portion 12 is mounted on base 11 for rotation about a vertical axis 21.

The first arm 13 is connected to the turning portion 12 for rotation about an axis 22 that intersects (e.g., is orthogonal to) the axis 21. Intersecting includes a case in which there is a twisted relationship such as a so-called three-dimensional crossing. The second arm 14 is connected to the tip portion of the first arm 13 for rotation about an axis 23 substantially parallel to the axis 22. The second arm 14 includes an arm base 15 and an arm end 16. The arm base 15 is connected to the tip portion of the first arm 13 and extends along an axis 24 that intersects (e.g., is orthogonal to) the axis 23. The arm end 16 is connected to the tip portion of the arm base 15 so as to rotate around the axis 24. The third arm 17 is connected to the tip portion of the arm end 16 for rotation about an axis 25 that intersects (e.g., is orthogonal to) the axis 24. The tip portion 18 is connected to the tip portion of the third arm 17 for rotation about an axis 26 that intersects (e.g., is orthogonal to) the axis 25. A working tool such as a hand, a suction nozzle, or a welding torch is attached to the tip portion 18.

As described above, the robots 2B and 2C have a joint 31 connecting the base 11 and turning portion 12, a joint 32 connecting the turning portion 12 and first arm 13, a joint 33 connecting the first arm 13 and the second arm 14, a joint 34 connecting the arm base 15 and the arm end 16 in second arm 14, a joint 35 connecting the arm end 16 and the third arm 17, and a joint 36 connecting the third arm 17 and the tip 18 portion.

The actuators 41, 42, 43, 44, 45, and 46 include, for example, an electric motor and a speed reducer, and drives the joints 31, 32, 33, 34, 35, and 36, respectively. For example, the actuator 41 rotates the turning portion 12 about the axis 21. The actuator 42 rotates the first arm 13 about the axis 22. The actuator 43 rotates the second arm 14 about the axis 23. The actuator 44 rotates the arm end 16 about the axis 24. The actuator 45 rotates the third arm 17 about the axis 25. The actuator 46 rotates the tip portion 18 about the axis 26.

The configurations of the robots 2B and 2C can be changed. For example, the robots 2B and 2C may be seven-axis redundant robots in which one axis joint is further added to the six-axis vertical articulated robot, or may be so-called SCARA articulated robots.

Returning to FIG. 1, the mobile robot 2D is a robot capable of autonomous traveling. The mobile robot 2D includes a robot 10 configured similarly to the robots 2B and 2C, and an automated guided vehicle 50. The automated guided vehicle 50 autonomously travels to transfer the robot 10. Examples of the automated guided vehicle 50 include a so-called electric Automated Guided Vehicle (AGV).

The production system 1 may further include an environmental sensor 5. The environmental sensor 5 detects the state of the work environment of the plurality of local devices 2 (hereinafter referred to as "environmental state"). Examples of the environmental sensor 5 include a camera that captures an image of the work environment of the plurality of local devices 2. The environmental sensor 5 may be a sensor that detects presence or absence of the workpiece 9 at a predetermined position using laser light or the like, or may be a sensor that detects the size or the like of the workpiece 9. The production system 1 may include a plurality of environmental sensors 5.

The control system 3 controls the plurality of local devices 2. Hereinafter, the configuration of the control system 3 will be described in detail.

Control System

The control system 3 operates the plurality of local devices 2 based on an operation program, and suspends operation of the plurality of local devices 2 when an abnormality occurs. When at least one of the plurality of local devices 2 is in an operable state even after the operation of the plurality of local devices 2 is suspended, it is desirable to immediately resume the operation of the operable local device 2 at the time when the need for the operation suspend disappears, thereby minimizing the downtime of the system. However, when the operation of the plurality of local devices 2 is suspended, an unexpected change may occur in the surrounding environment of the plurality of local devices 2.

On the other hand, the control system 3 is configured to: operate the plurality of local devices 2 in a real space based on the operation program; suspend the operation by the plurality of local devices 2; simulate a suspended state of the real space after suspension of the operation by the plurality of local devices 2 in virtual space; and resume at least a part of the operation by the plurality of virtual local devices based on the operation program in the virtual space in which the state of the real space has been simulated.

By simulating the state of the real space in which the operation of the plurality of local devices 2 is suspended in the virtual space and then resuming the operation of the plurality of virtual local devices in the virtual space, it is possible to easily simulate when the operation of the plurality of local devices 2 is resumed in the real space. This makes it possible to quickly grasp an event that would occur when the operation of one or more robots is resumed, prior to the actual resumption of the operation by the one or more robots. Therefore, it is effective to quickly cope with the stop of the production system 1.

Figure 3A:
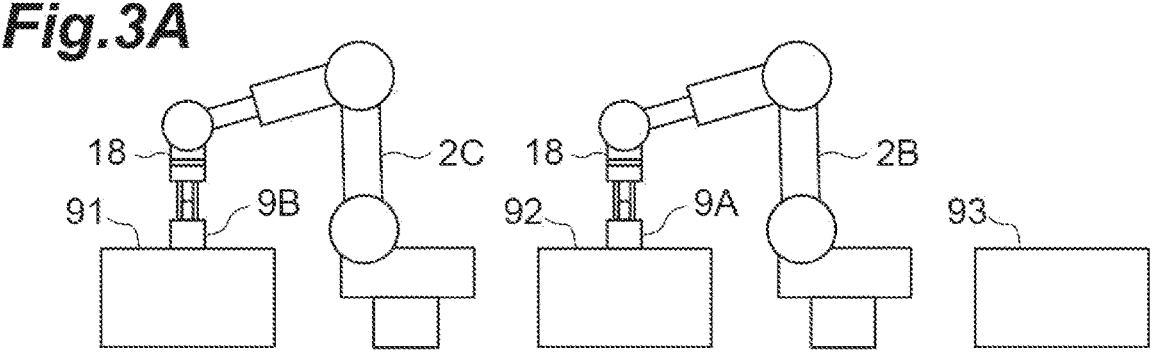
FIGS. 3A, 3B, 3C, and 3D are example diagrams illustrating operations and operation suspend of two robots.
Figure 3B:
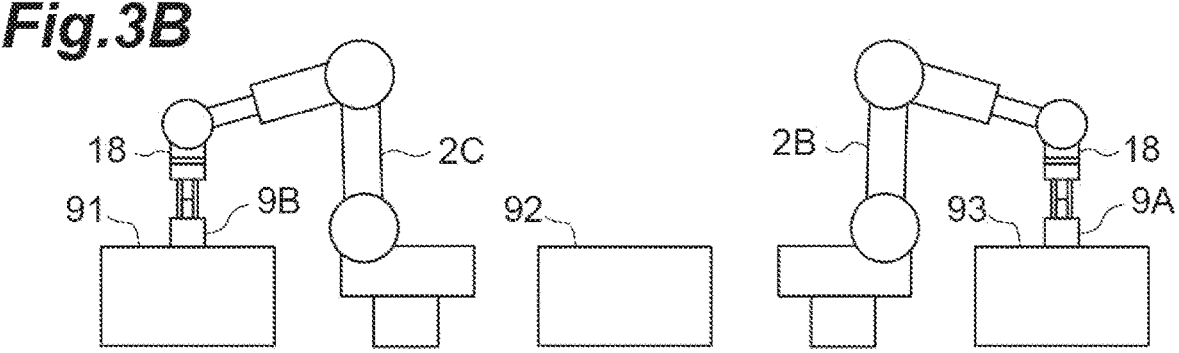
Figure 3C:
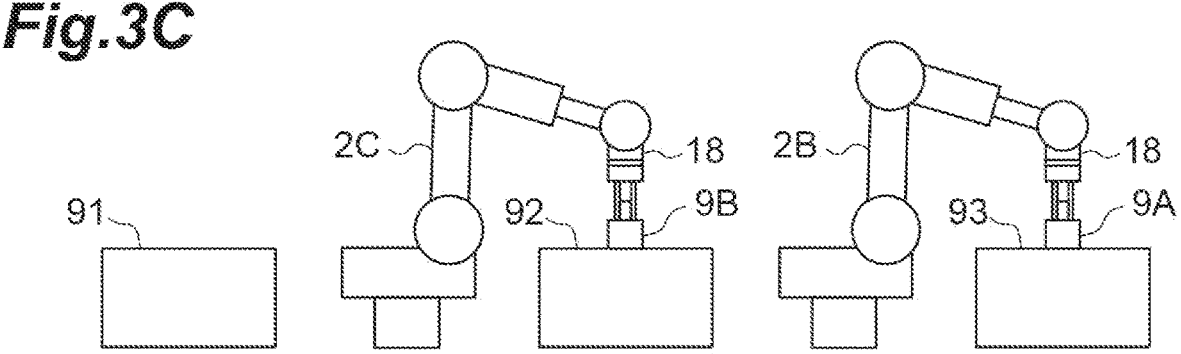

Hereinafter, an example of the simulation will be described with reference to the drawings. FIGS. 3A, 3B, 3C, and 3D are diagrams illustrating operations and operation suspend of two robots. FIGS. 3A, 3B, 3C, and 3D show an example in which the control system 3 operates the robots 2B and 2C to carry a workpiece. In detail, the control system 3 operates the robot 2B to transfer a workpiece 9A on a workpiece support 92 to a workpiece support 93 as shown in FIGS. 3A and 3B, and then operates the robot 2C to transfer the workpiece 9B on a workpiece support 91 to the workpiece support 92 by the robot 2C as shown in FIGS. 3B and 3C.

Figure 3D:
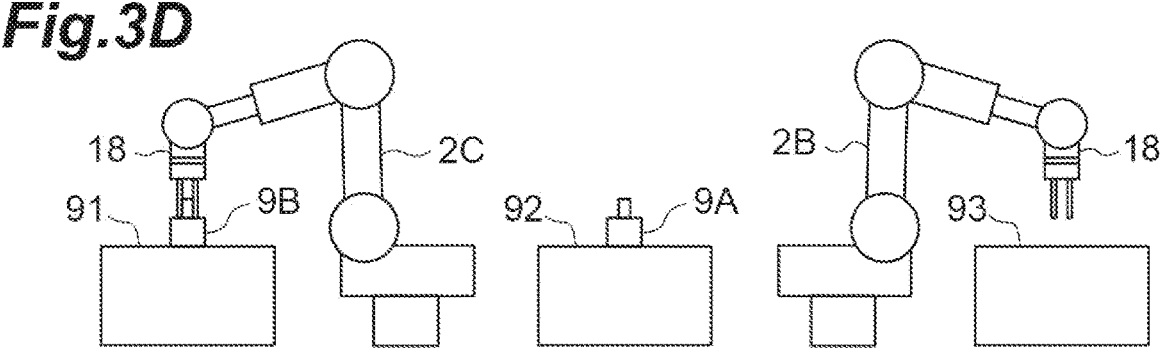

The control system 3 suspends the operation of the robots 2B and 2C in response to the occurrence of an abnormality or the like. As an example of the occurrence of the abnormality, FIG. 3D shows a state in which the robots 2B and 2C are stopped due to a failure of the robot 2B to grasp the workpiece 9A. While the tip portion 18 of the robot 2B has reached the workpiece support 93, the workpiece 9A remains on the workpiece support 92. In this case, the control system 3 suspends the operation of the production system 1 including the robots 2B and 2C.

Figure 4A:
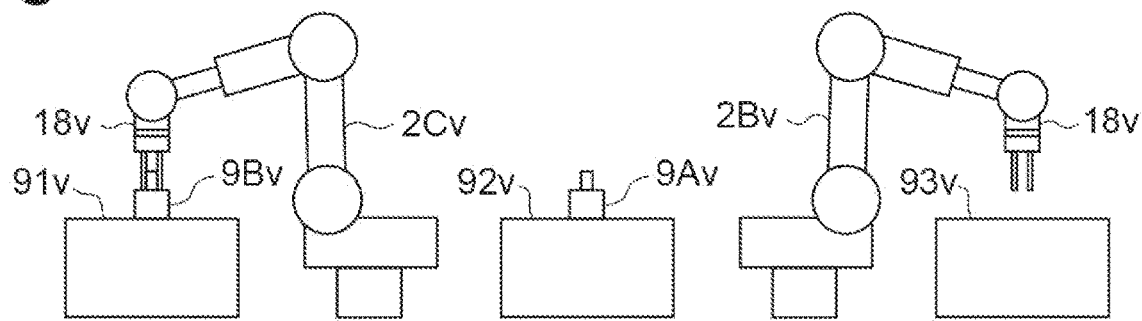
FIGS. 4A, 4B, and 4C are example diagrams illustrating a resumption simulation of a suspended operation.

The control system 3 simulates, in the virtual space, the state of the real space in which the workpiece 9A is left on the workpiece support 92 even after the tip portion of the robot 2b moves onto the work support 93. For example, as shown in FIG. 4A, the control system 3 simulates a state in which the tip portion 18v of the virtual robot 2Bv is located on the virtual workpiece support 93v, the virtual workpiece 9Av is left on the virtual workpiece support 92v, the virtual workpiece 9Bv is located on the virtual workpiece support 91v, and the tip portion 18v of the virtual robot 2Cv is located on the virtual workpiece support 91v in the virtual space.

The virtual robot 2Bv corresponds to the robot 2B. The virtual robot 2Cv corresponds to the robot 2C. The virtual workpiece 9Av corresponds to the workpiece 9A. The virtual workpiece 9Bv corresponds to the workpiece 9B. The virtual workpiece support 91v corresponds to the workpiece support 91. The virtual workpiece support 92v corresponds to the workpiece support 92. The virtual workpiece support 93v corresponds to the workpiece support 93.

Figure 4B:
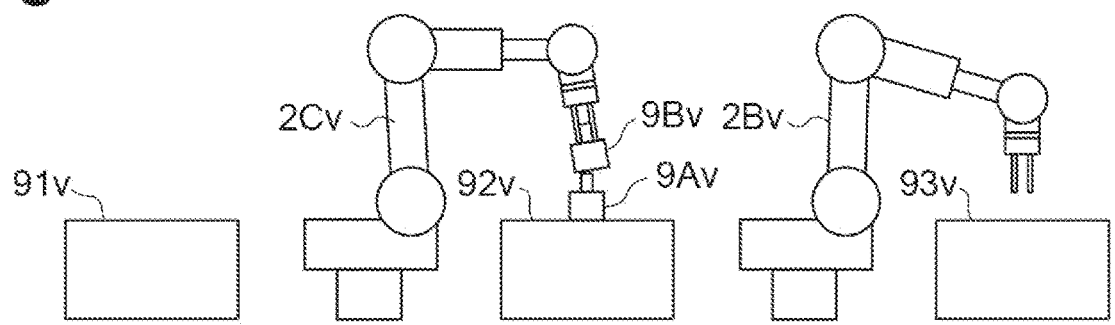
Figure 4C:
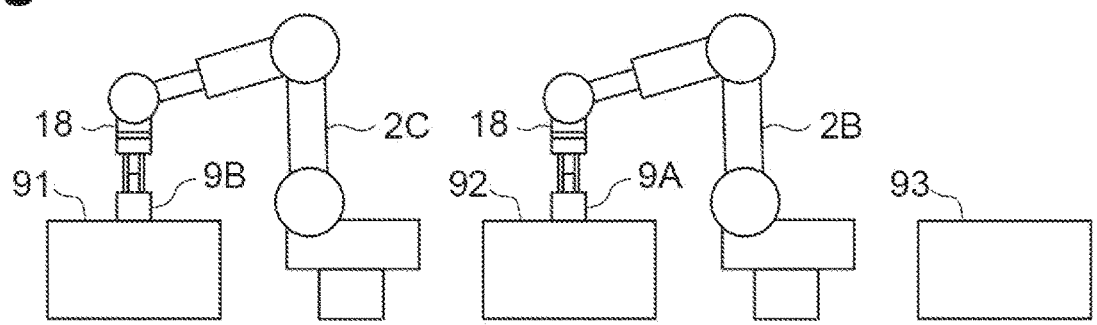

Thereafter, the control system 3 resumes the operation of the virtual robots 2Bv and 2Cv in the virtual space based on the operation program. For example, the control system 3 operates the virtual robot 2Cv to resume the operation of transferring the virtual workpiece 9Cv from the virtual workpiece support 91v to the virtual workpiece support 92v (see FIG. 4B). By this simulation, a collision between the virtual workpiece 9Av left on the virtual workpiece support 92v and the virtual workpiece 9Bv carried on the virtual workpiece support 92v by the virtual robot 2Cv is detected. From such a simulation result, it can be easily grasped that it is inappropriate to resume the operation from the transfer of the workpiece 9B by the robot 2C. As a result, it is possible to promptly perform an appropriate action such as resuming the operation from the grasping of the workpiece 9A by the robot 2B (see FIG. 4C).

Figure 5A:
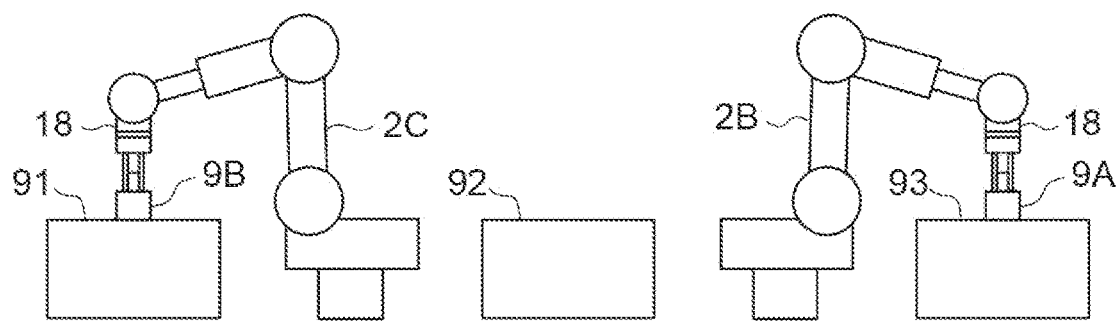
FIGS. 5A and 5B are example diagrams illustrating the resumption simulation of the suspended operation.

In some cases, the control system 3 may suspend the operations of the robots 2B and 2C due to the abnormalities of the robots 2B and 2C themselves. FIG. 5A shows a state in which abnormality such as overcurrent occurs in the robot 2B and the operations of the robots 2B and 2C are suspended when the workpiece 9A reaches the workpiece support 93. In this case, the control system 3 resumes the operation of the virtual robot 2Cv while the virtual robot 2Bv is at rest. For example, while the virtual robot 2Bv is at rest, the control system 3 operates the virtual robot 2Cv to resume an operation of transferring the virtual workpiece 9Bv from the virtual workpiece support 91v to the virtual workpiece support 92v (see FIG. 5B). This simulation confirms that the workpiece 9B can be transferred from the workpiece support 91 to the workpiece support 92 without collision.

Figure 6A:
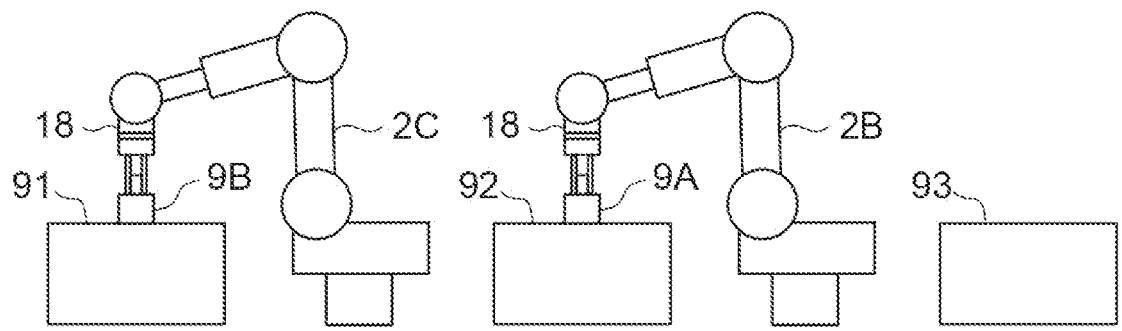
FIGS. 6A and 6B are example diagrams illustrating the resumption simulation of the suspended operation.

FIG. 6A shows a state in which abnormality such as overcurrent occurs in the robot 2B at the stage of gripping the workpiece 9A, and the operations of the robots 2B and 2C are suspended. In this case, the control system 3 resumes the operation of the virtual robot 2Cv while the virtual robot 2Bv is at rest. For example, while the virtual robot 2Bv is at rest, the control system 3 operates the virtual robot 2Cv to resume an operation of transferring the virtual workpiece 9Bv from the virtual workpiece support 91v to the virtual workpiece support 92v (see FIG. 6B).

By this simulation, a collision between the virtual robot 2Bv and the virtual robot 2Cv, a collision between the virtual workpiece 9Bv and the virtual robot 2Bv, or a collision between the virtual workpiece 9Bv and the virtual workpiece 9Av is detected on the virtual workpiece support 92v. From such a simulation result, it can be easily grasped that it is inappropriate to resume the operation from the transfer of the workpiece 9B by the robot 2C while the robot 2B is at rest on the workpiece support 92. As a result, it is possible to promptly take appropriate measures such as resuming the operation of the robot 2C after retracting the robot 2B and the workpiece 9A are retracted onto the workpiece support 93.

Figure 7A:
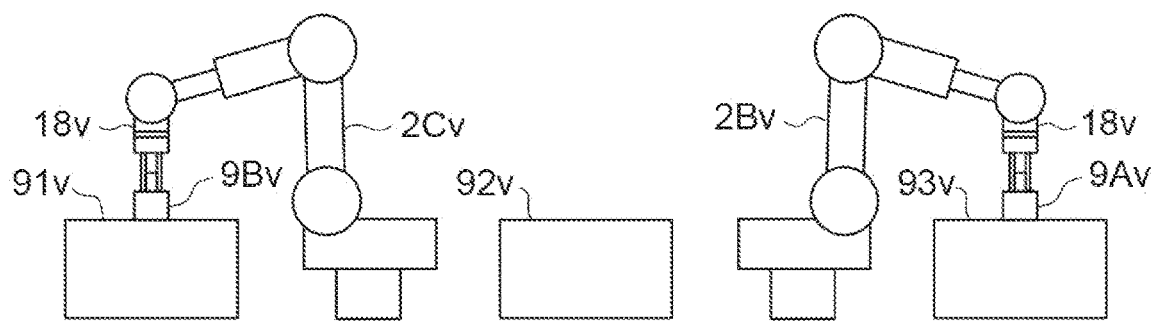
FIGS. 7A and 7B are example diagrams illustrating the resumption simulation of the suspended operation.

The control system 3 may simulate, in the virtual space, the state of the real space in which the robot 2B and the workpiece 9A are retracted on the workpiece support 93, and execute the simulation again. For example, the control system 3 simulates, in the virtual space, a state in which the tip portion 18v of the virtual robot 2Bv and the virtual workpiece 9Av are located on the virtual workpiece support 93v and the tip portion 18v of the virtual robot 2Cv and the virtual workpiece 9Bv are located on the virtual workpiece support 91v after the robot 2B and the workpiece 9A are retracted onto the workpiece support 93 (see FIG. 7A).

Figure 7B:
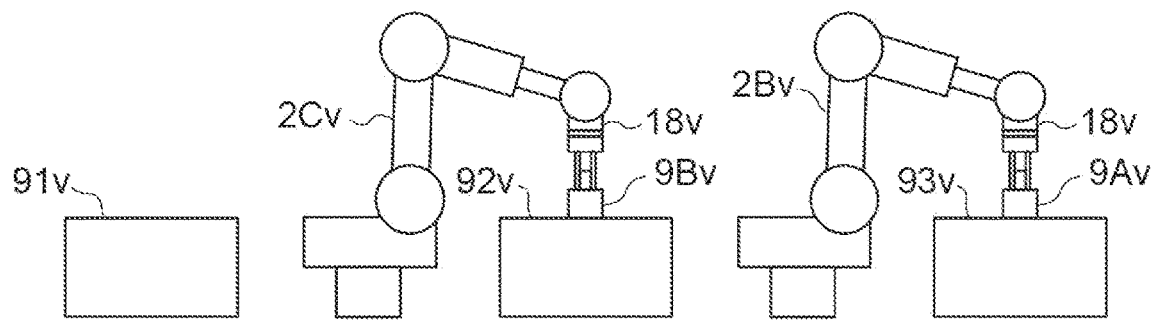

Thereafter, the control system 3 resumes the operation of the virtual robot 2Cv in the state in which the virtual robot 2Bv is at rest. For example, while the virtual robot 2Bv is at rest, the control system 3 operates the virtual robot 2Cv to resume an operation of transferring the virtual workpiece 9Bv from the virtual workpiece support 91v to the virtual workpiece support 92v (see FIG. 7B). This simulation confirms that the workpiece 9B can be transferred from the workpiece support 91 to the workpiece support 92 without collision.

Hereinafter, the configuration of the control system 3 will be described in more detail. As shown in FIG. 1, the control system 3 includes a controller 6 and a data management apparatus 300. The controller 6 is configured to operate the plurality of local devices 2 in real space based on the operation program. The real space is a space where the plurality of local devices 2 actually exists.

The controller 6 includes a plurality of local controllers 100 and a host controller 200 (cell controller). Each of the plurality of local controllers 100 is configured to control a corresponding local device 2 of the plurality of local devices 2 based on the operation program.

The host controller 200 is configured to output an execution command of the operation program to each of the plurality of local controllers 100 based on the process for the workpiece 9, progress information of the process, and environment information. For example, the operation program includes a plurality of task programs subdivided into a plurality of tasks.

The host controller 200 is configured to output an execution command of the next task to each of the plurality of local controllers 100 based on the process for the workpiece 9, the progress information of the process, and the environment information. The host controller 200 updates the progress information and the environment information in accordance with the operation of the plurality of local devices 2.

For example, the host controller 200 performs synchronous communication with the plurality of local controllers 100. The synchronous communication means that communication with the plurality of local controllers 100 is repeatedly performed in a synchronous communication cycle synchronized with a synchronous frame having a predetermined period. The host controller 200 repeatedly outputs the execution command and updates the progress information and the environment information in synchronization with the cycle of the synchronous communication.

Each of the plurality of local controllers 100 operates the local device 2 under control based on the task program of the next task. In the figure, the control system 3 includes four local controllers 100A, 100B, 100C, and 100D. The local controller 100A is a device controller that controls the transfer device 2A. The local controller 100B is a robot controller that controls the robot 2B. The local controller 100C is a robot controller that controls the robot 2C. The local controller 100D is a robot controller that controls the mobile robot 2D. The number of local controllers 100 and the configuration of each of the local controllers 100 can be changed in accordance with the number and type of local devices 2.

The data management apparatus 300 includes the virtual controller and is configured to perform synchronous communication or asynchronous communication with the host controller 200. The data management apparatus 300 includes the virtual controller, and is configured to: simulate a suspended state of the real space after suspension of the operation by the plurality of local devices 2 in the virtual space; and to cause the virtual controller to resume the operation by the plurality of virtual local devices based on the operation program in the virtual space in which the suspended state of the real space has been simulated.

Figure 8:
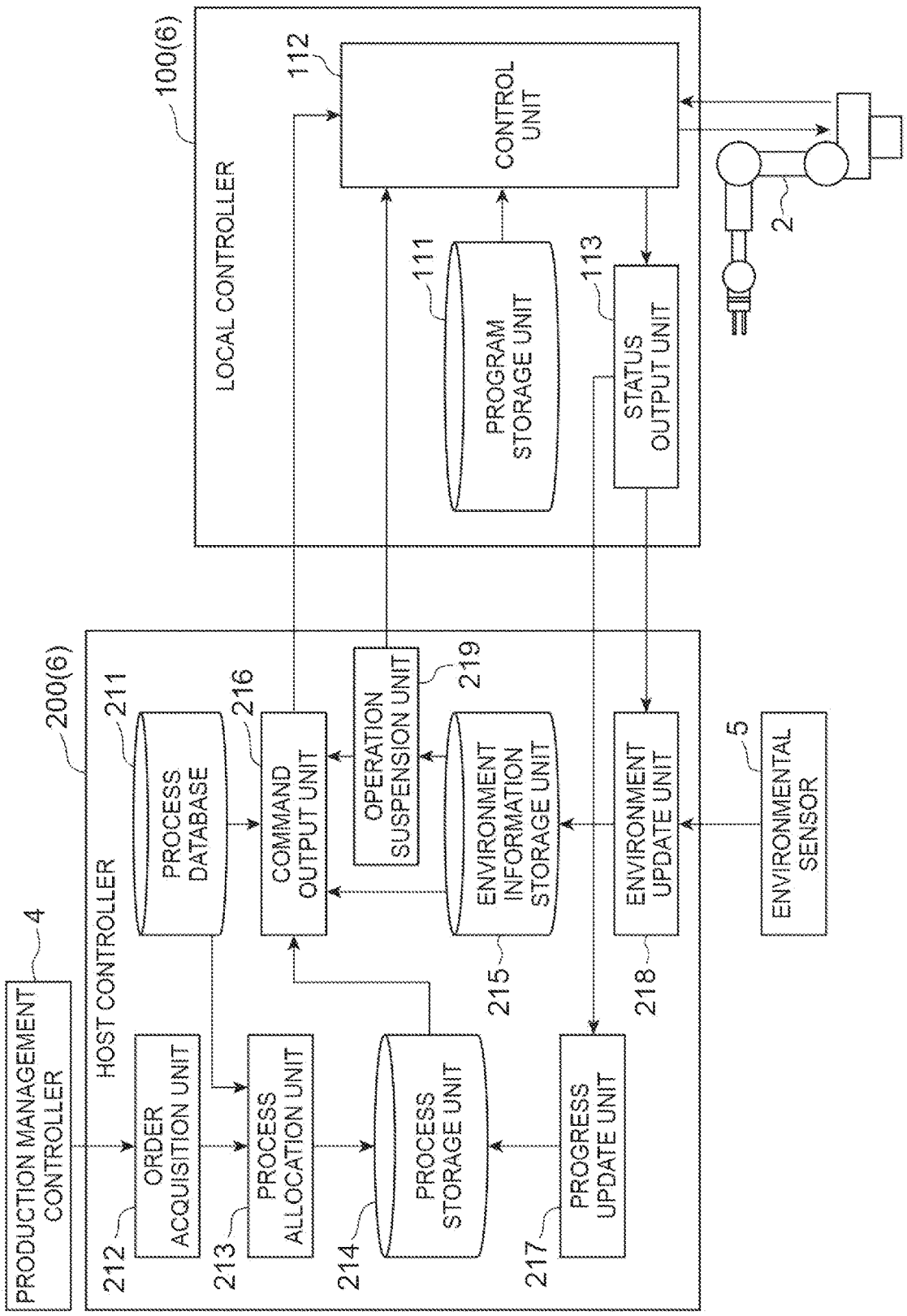
FIG. 8 is an example block diagram illustrating a configuration of a controller.

As shown in FIG. 8, the host controller 200 includes, as a functional configuration (hereinafter referred to as "functional block"), a process database 211, an order acquisition unit 212, a process allocation unit 213, a process storage unit 214, an environment information storage unit 215, a command output unit 216, a progress update unit 217, an environment update unit 218, and an operation suspension unit 219.

The process database 211 stores a plurality of processes for each of a plurality of types of workpieces 9 to be processed by the production system 1. Each process includes identification information of each of a plurality of tasks for the workpiece 9, an execution order of the plurality of tasks, and identification information of the local device 2 that executes each of the plurality of tasks.

The plurality of tasks may include tasks executed by different local devices 2. For example, the plurality of tasks may include a plurality of tasks executed by the robot 2B, 2C, or the mobile robot 2D and one or more tasks executed by another local device 2. The task is a set of work units executed by one local device 2.

The order acquisition unit 212 acquires the production order of the workpiece 9 from the production management controller 4. The production order includes the type of workpiece 9 to be produced and the production quantity for each type. The production management controller 4 is a controller that allocates a production order of the workpiece 9 according to a production plan to a plurality of factory cells in a manufacturing execution system (MES) of a factory, for example, and performs synchronous communication or asynchronous communication with the host controller 200.

The process allocation unit 213 allocates a process to the workpiece 9 designated by the production order. For example, the process allocation unit 213 allocates a process to the workpiece 9 designated by the production order based on the process database 211. In a case where the production order specifies a plurality of workpieces 9, the process allocation unit 213 allocates a process to each of the plurality of workpieces 9 based on the process database 211. The plurality of workpieces 9 may include different types of workpieces 9.

The process storage unit 214 stores the process allocation result by the process allocation unit 213 and the progress information for each process (progress information in real space). FIG. 9 is a table showing an example of results of process assignment to a plurality of workpieces 9. In this table, the execution order of a plurality of tasks in each process is indicated by the arrangement order from left to right. In FIG. 9, a process including tasks a1, a2, and a3 of three steps is assigned to a workpiece A. A process including tasks b1, b2, b3, b4, and b5 of five steps is assigned to a workpiece B. A process including tasks c1 and c2 of two steps is assigned to a workpiece C. A process including tasks d1, d2, and d3 of three steps is assigned to a workpiece D. A process including tasks e1, e2, e3, and e4 of four steps is assigned to a workpiece E.

The progress information for each process is, for example, information indicating whether each task of the process has not been started, is being executed, or has been completed. The progress information may be a flag indicating unstarted, in execution, or completed, or may be a start time and a completion time. In a case where the progress information is the start time and the completion time, if neither the start time nor the completion time is stamped, it is unstarted, if the start time is stamped and the completion time is not stamped, it is being executed, and if the completion time is stamped, it is completed.

The environment information storage unit 215 is configured to store real environment information representing the state of the real space. The real environment information includes, for example, information on the local device 2 (hereinafter referred to as "device information") and information on the workpiece 9 (hereinafter, referred to as "workpiece information"). Examples of the device information include position/posture information of the local device 2. Examples of the position/posture information of the local device 2 include posture information of the robots 2B and 2C and position/posture information of the mobile robot 2D. The posture information of the robots 2B and 2C may be motion angular information of the joints 31, 32, 33, 34, 35, and 36 or may be position/posture information of the tip portion 18. The position/posture information of the mobile robot 2D includes, for example, position/posture information of the automated guided vehicle 50 and the posture information of the robot 10. The posture information of the robot 10 may be motion angle information of the joints 31, 32, 33, 34, 35, and 36 or may be position/posture information of the tip portion 18 (position/posture with respect to the automated guided vehicle 50).

The device information includes a control signal (hereinafter referred to as a "real control signal") generated between the local controller 100 and the corresponding local device 2. The real control signal may be an internal signal generated by the local controller 100 for controlling the corresponding local device 2, may be an output signal output from the local controller 100 to the corresponding local device 2, or may be a feedback signal output from the corresponding local device 2 to the local controller 100. Examples of the internal signal include command values of the position/posture of the corresponding local device 2. Examples of the output signal include an output current value to the actuator of the corresponding local device 2. Examples of the feedback signal include detection values of a position/posture, a speed, and the like in the corresponding local device 2.

FIG. 10 is a table illustrating device information. In FIG. 10, identification information of the local device 2 is associated with at least one status parameter indicating information on the local device 2.

Figure 11:
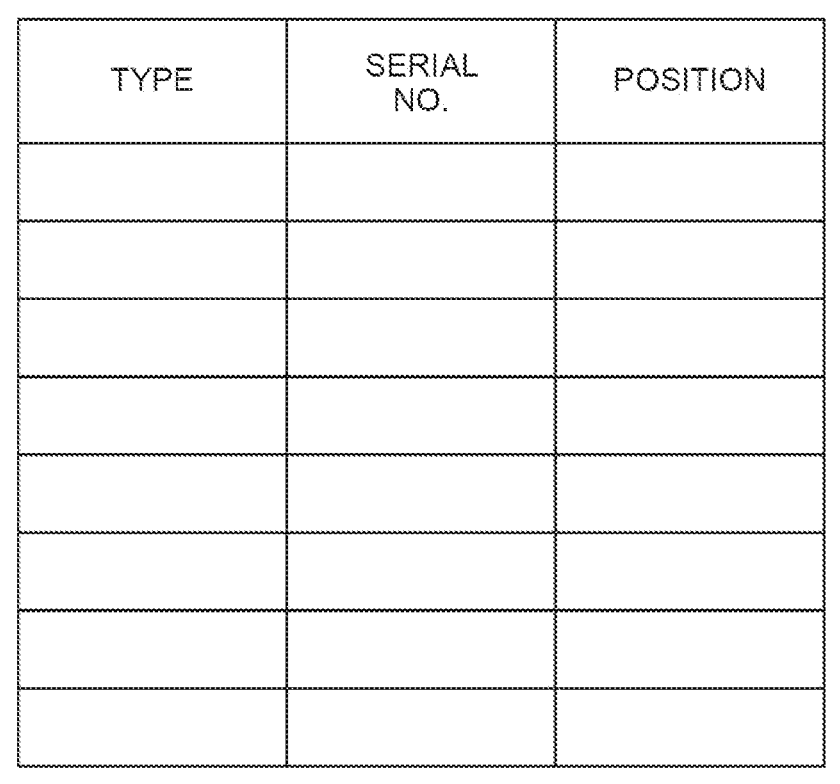

Examples of the workpiece information include position information of each workpiece 9. FIG. 11 is a table illustrating workpiece information. In FIG. 11, the identification information (for example, type and serial number) of the workpiece 9 is associated with the position information of the workpiece 9.

Returning to FIG. 8, the command output unit 216 outputs an execution command of the next task based on the process stored in the process storage unit 214, the progress information of the process, and the real environment information stored in the environment information storage unit 215. The next task in the plurality of tasks is a task in which the previous task is not present or the previous task is completed among the tasks that have not been started yet. For example, the command output unit 216 extracts the next task based on the progress information of the process, and outputs the execution command of the next task to one of the plurality of local controllers 100 in a case where the real environment information satisfies the execution condition of the next task.

Examples of the execution condition include the following.

Example 1-1) The target workpiece 9 of the next task has reached a position where the next task can be executed.
Example 1-2) There is no obstacle in the operation range of the local device 2 that executes the next task.
Examples of the obstacle include another local device 2, a workpiece 9 held by another local device 2, and a person.

In the process storage unit 214, when a plurality of processes are respectively assigned to a plurality of workpieces 9, the command output unit 216 extracts a plurality of next tasks for each of the plurality of processes based on a plurality of pieces of progress information for each of the plurality of processes, and sequentially outputs the extracted next tasks starting from a task for which real environment information satisfies an execution condition. The command output unit 216 may output the execution command of the next task in response to a request from the local controller 100 in the synchronous communication, or may output the execution command regardless of the presence or absence of the request from the local controller 100.

The progress update unit 217 updates the progress information of the process storage unit 214 according to the execution status of the next task by the plurality of local devices 2. For example, the progress update unit 217 updates the progress information of the process storage unit 214 based on status information, which will be described later, output from the local controller 100.

The environment update unit 218 is configured to update the real environment information of the environment information storage unit 215 in accordance with the operation of the plurality of local devices 2. For example, the environment update unit 218 acquires the status information of the local device 2 from each of the plurality of local controllers 100, and updates the device information based on the status information.

The environment update unit 218 may acquire the status information of the plurality of local devices 2 from the plurality of local controllers 100 in each cycle of the synchronous communication and update the device information based on the status information. Accordingly, the status information of the plurality of local devices 2 can be reflected in the real environment information in the mutually synchronized state.

The environment update unit 218 may further update the workpiece information based on the status information of the local device 2. For example, the environment update unit 218 may update the position information of each workpiece 9 based on the status information of the transfer device 2A acquired from the local controller 100A. Further, in the example of FIGS. 3A, 3B, 3C, and 3D, the environment update unit 218 may update the position of the workpiece 9A from the workpiece support 92 to the workpiece support 93 in response to the robot 2B completing the task of transferring the workpiece 9A from the workpiece support 92 to the workpiece support 93.

The environment update unit 218 may update real environment information further based on the detection result of the environmental sensor 5. The detection result of the environmental sensor 5 is also aggregated in the environment information of the host controller 200, so that the detection result of the environmental sensor 5 and the status information of the plurality of local devices 2 can be reflected in the environment information along the same time axis. For example, the environment update unit 218 may update the workpiece information based on the image information detected by the environmental sensor 5, or may update the device information based on the image information detected by the environmental sensor 5. For example, the environment update unit 218 may update the position of the workpiece based on image information detected by the environmental sensor 5.

The operation suspension unit 219 is configured to cause the controller 6 to suspend the operation based on the operation program by the plurality of local devices. For example, the operation suspension unit 219 suspends the operation of the plurality of local devices 2 by the controller 6. For example, the operation suspension unit 219 is further configured to suspend the operation of the plurality of local devices 2 in response to detecting an abnormality of any of the plurality of local devices 2 based on the environment information stored in the environment information storage unit 215. For example, when detecting an abnormality of any of the plurality of local devices 2, the operation suspension unit 219 causes the command output unit 216 to suspend the output of the execution command and causes each of the plurality of local controllers 100 to suspend the task being executed.

The abnormality of any of the plurality of local devices 2 includes an abnormality of the local device 2 itself and an abnormality of the surrounding environment caused by the operation of the local device 2 (for example, an abnormality of the position of the workpiece 9). In the example of FIGS. 3A, 3B, 3C, and 3D, the operation suspension unit 219 detects abnormality when the workpiece information indicates that the workpiece 9A remains on the workpiece support 92 even though the instrument information indicates that the tip portion 18 of the robot 2B has reached the workpiece support 93. Such a discrepancy between the device information and the workpiece information can be detected in a case where the device information is updated based on the status information of the local device 2 and the workpiece information is updated based on the detection result of the environmental sensor 5.

Figure 5B:
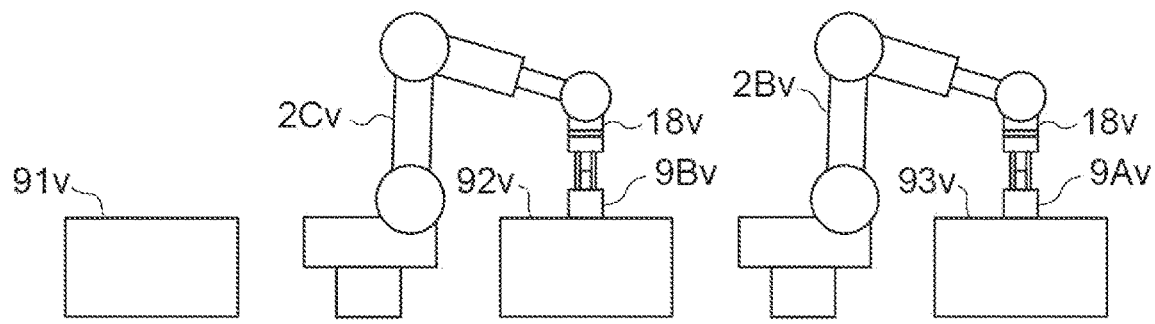

In the example of FIGS. 5A and 5B, when any of the device information of the robot 2B (for example, position information, speed information, torque information, current information, and the like) indicates an abnormality value, the operation suspension unit 219 detects abnormality. An example of the case where the device information indicates the abnormality value is that a case where the torque information or the current information becomes an excessive value due to a failure of a speed reducer or the like. Another example of the case where the device information indicates the abnormality value is that the driving current of the tip portion 18 becomes an excessively small value due to a failure in gripping the workpiece 9 by the tip portion 18.

As shown in FIG. 8, the local controller 100 includes a program storage unit 111, a control unit 112, and a status output unit 113 as functional blocks. The program storage unit 111 stores an operation program of the local device 2. As described above, the operation program may include a plurality of task programs subdivided into a plurality of tasks. Each of the plurality of task programs includes a plurality of operation commands in a time series. When the local device 2 is a robot 2B, a robot 2C, or a mobile robot 2D, the operation command includes a target position and a target posture of the tip portion 18, a moving speed to the target position and the target posture, and the like.

When acquiring the execution command output by the command output unit 216, the control unit 112 extracts the task program corresponding to the next task indicated by the execution command from the program storage unit 111, and operates the local device 2 based on the extracted task program.

The status output unit 113 outputs the status information of the corresponding local device 2 to the host controller 200. The status information includes at least the position/posture information of the corresponding local device 2 under control. The status information includes information of a control signal (the real control signal) generated between the local controller 100 and the corresponding local device 2. The real control signal may be an internal signal generated by the local controller 100 for controlling the corresponding local device 2, may be an output signal output from the corresponding local controller 100 to the local device 2, or may be a feedback signal output from the corresponding local device 2 to the local controller 100.

Examples of the internal signal include command values of the position/posture of the corresponding local device 2 under control. Examples of the output signal include an output current value to the actuator of the corresponding local device 2 under control. Examples of the feedback signal include detection values of a position/posture, a speed, and the like in the corresponding local device 2. The feedback signal may further include the position, speed, driving force (e.g., torque), driving current, etc. of the actuator of the corresponding local device 2.

In addition, the status information may include an occurrence state of an alarm (for example, an overcurrent alarm) or the like in the control of the local device 2 under control. The status output unit 113 may output a task completion notification included in the status information in response to completion of execution of the task program.

The status output unit 113 may output status information in response to a request from the host controller 200 in the synchronous communication, or may output status information regardless of the presence or absence of a request from the host controller 200.

Figure 12:
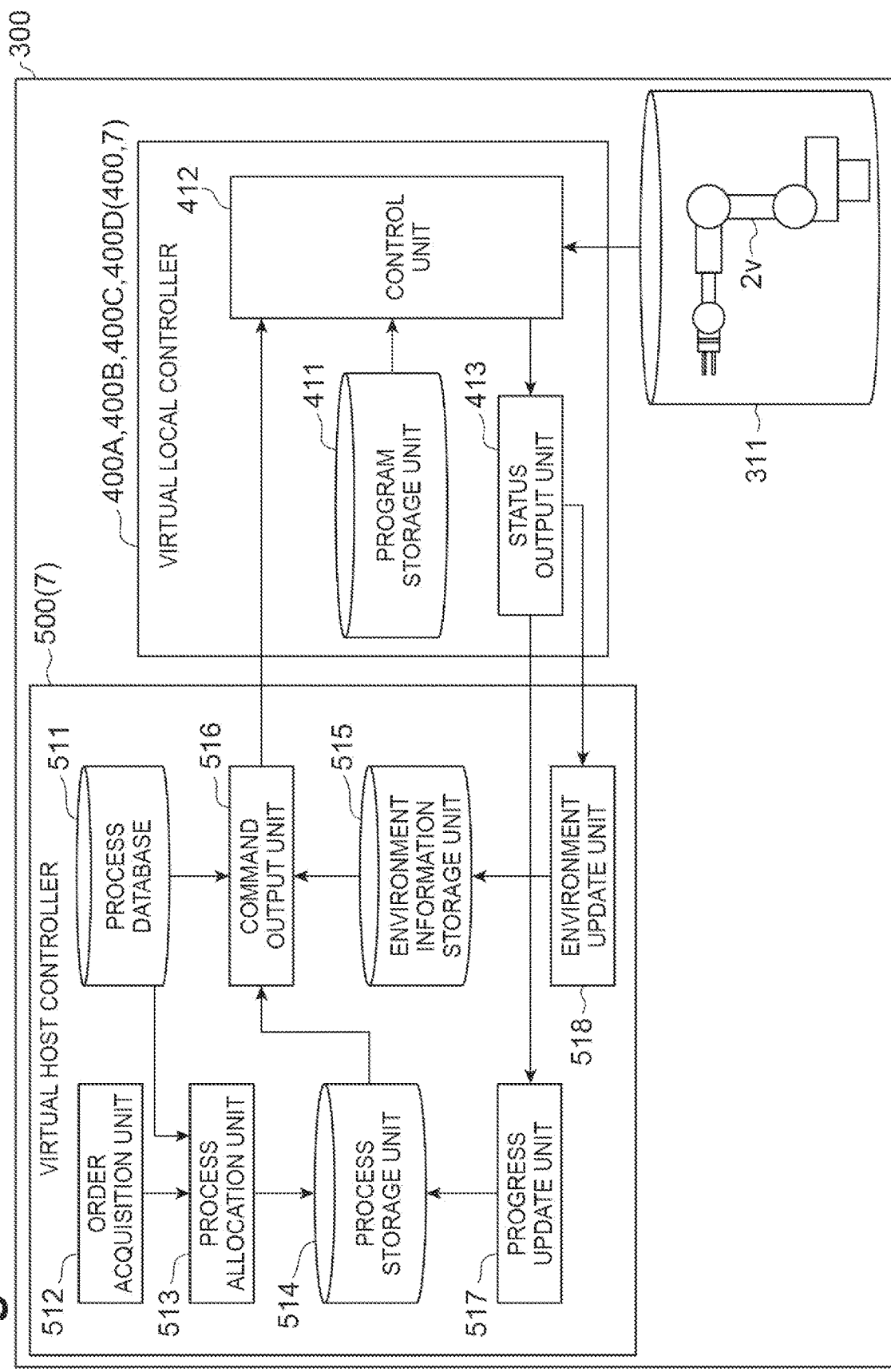
FIG. 12 is an example block diagram illustrating a configuration of a data management apparatus.

As shown in FIG. 12, the data management apparatus 300 includes a model storage unit 311 and a virtual controller 7. The model storage unit 311 stores models of a plurality of virtual local devices 2v corresponding to the plurality of local devices 2. The model of the virtual local device 2v includes parameters such as the arrangement and structure of the corresponding local device 2 in real space, the dimensions of each part, and the mass of each part. The model storage unit 311 also stores a model of the surrounding environment of the plurality of virtual local devices 2v in the virtual space. The model of the surrounding environment includes parameters such as the arrangement in real space, the three-dimensional shape, and the dimensions of the surrounding objects of the plurality of local devices 2.

The virtual controller 7 is configured to operate a plurality of virtual local devices 2v based on the operation program in the virtual space. The virtual space is a virtual space on a simulation in which the plurality of local devices 2 do not exist. Operating the plurality of virtual local devices 2v in the virtual space means simulating the operation of the plurality of local devices 2 in the real space based on the models of the plurality of virtual local devices 2v stored in the model storage unit 311 and the models of the surrounding environments of the plurality of virtual local devices 2v.

For example, the virtual controller 7 includes a plurality of virtual local controllers 400 and a virtual host controller 500 corresponding to the host controller 200. Each of the plurality of virtual local controllers 400 controls one virtual local device 2v among the plurality of virtual local devices 2v based on the operation program.

The virtual host controller 500 outputs an execution instruction of the operation program to each of the plurality of virtual local controllers 400 based on the process for the virtual workpiece 9v, the progress information of the process, and the environment information. For example, the virtual host controller 500 outputs the execution command of the next task to each of the plurality of virtual local controllers 400 based on the process for the virtual workpiece 9v, the progress information of the process, and the environment information. The virtual host controller 500 updates the progress information and the environment information in accordance with operations of the plurality of virtual local devices 2v.

The plurality of virtual local controllers 400 correspond to the plurality of local controllers 100, respectively. For example, the virtual controller 7 includes a virtual local controller 400A corresponding to the local controller 100A, a virtual local controller 400B corresponding to the local controller 100B, a virtual local controller 400C corresponding to the local controller 100C, and a virtual local controller 400D corresponding to the local controller 100D.

Virtual local controllers 400B, 400C, and 400D corresponding to the robot controllers 100B, 100C, and 100D, respectively, are virtual robot controllers. The virtual local devices controlled by the virtual local controllers 400B and 400C are virtual robots (for example, the virtual robots 2Bv and 2Cv), and the virtual local device controlled by the virtual local controller 400D is a virtual mobile robot.

Each of the plurality of virtual local controllers 400 operates a corresponding virtual local device 2v in the virtual space based on the task program of the next task and the model of the corresponding virtual local device 2v and the model of the surrounding environment stored in the model storage unit 311.

The virtual host controller 500 includes a process database 511, an order acquisition unit 512, a process allocation unit 513, a process storage unit 514, an environment information storage unit 515, a command output unit 516, a progress update unit 517, and an environment update unit 518, which correspond to the process database 211, the order acquisition unit 212, the process allocation unit 213, the process storage unit 214, the environment information storage unit 215, the command output unit 216, the progress update unit 217, and the environment update unit 218, respectively.

Similarly to the process database 211, the process database 511 stores a plurality of processes for each of a plurality of types of virtual works 9v targeted by the production system 1. The order acquisition unit 512 acquires a production order for simulation from, for example, an input device 396 described later.

Similarly to the process allocation unit 213, the process allocation unit 513 allocates a process to the virtual workpiece 9v specified by the production order. For example, the process allocation unit 513 allocates a process to virtual workpiece 9v specified by the production order based on the process database 511. Similarly to the process storage unit 214, the process storage unit 514 stores the process allocation result by the process allocation unit 513 and the progress information for each process (progress information in the virtual space).

The environment information storage unit 515 stores virtual environment information. The configuration of the virtual environment information is the same as the configuration of the environment information. The virtual environment information includes device information in the virtual space and workpiece information in the virtual space. An example of the device information in the virtual space is the position/posture information of the virtual local device 2v in the virtual space.

The device information in the virtual space includes information of a control signal generated between the virtual local controller 400 and the corresponding virtual local device 2v (hereinafter referred to as "virtual control signal"). The virtual control signal may be an internal signal generated by the virtual local controller 400 for controlling the corresponding virtual local device 2v, an output signal output from the virtual local controller 400 to the corresponding virtual local device 2v, or a feedback signal output from the corresponding virtual local device 2v to the virtual local controller 400. Examples of the internal signal include command values of the position/posture of the correspondent virtual local device 2v. Examples of the output signal include an output current value to the actuator of the correspondent virtual local device 2v. An example of the feedback signal is a simulation result of the operation of the corresponding virtual local device 2v based on the output signal and the model information stored in the model storage unit 311. An example of the workpiece information in the virtual space is position information of each virtual workpiece 9v in the virtual space.

Similarly to the command output unit 216, the command output unit 516 outputs an execution command of the next task based on the process stored in the process storage unit 514, the progress information of the process in the virtual space, and the virtual environment information stored in the environment information storage unit 515.

The command output unit 516 outputs an execution command of the next task to one of the plurality of virtual local controllers 400 based on the process database 511. For example, the command output unit 516 extracts the next task based on the progress information of the process, and outputs an execution command of the next task to one of the plurality of virtual local controllers 400 when the virtual environment information satisfies the execution condition of the next task. For example, the command output unit 516 outputs the execution command of the next task to the virtual local controller 400 of the virtual local device 2v of the local device 2 associated with the next task in the process database 511.

Similarly to the progress update unit 217, the progress update unit 517 updates the progress information of the process storage unit 514 in accordance with the execution status of the next task by the plurality of virtual local devices. For example, the progress update unit 517 updates the progress information of the process storage unit 514 based on status information, which will be described later, output from the virtual local controller 400. The environment update unit 518 updates the virtual environment information of the environment information storage unit 515 in accordance with the operation of the plurality of virtual local devices 2v.

The virtual local controller 400 includes a program storage unit 411, a control unit 412, and a status output unit 413 corresponding to the program storage unit 111, the control unit 112, and the status output unit 113, respectively, as more detailed functional blocks. Similarly to the program storage unit 111, the program storage unit 411 stores an operation program of the corresponding virtual local device 2v.

When acquiring the execution command output by the command output unit 516, the control unit 412 extracts the task program corresponding to the next task indicated by the execution command from the program storage unit 411, and operates the virtual local device 2v to operate based on the extracted task program. For example, the control unit 412 simulates the operation of the local device 2 corresponding to the corresponding virtual local device 2v in real space based on the models of the plurality of virtual local devices 2v stored in the model storage unit 311 and the models of the surrounding environments of the plurality of virtual local devices 2v. Similarly to the status output unit 113, the status output unit 413 outputs the status information of the corresponding virtual local device 2v to the virtual host controller 500.

Figure 13:
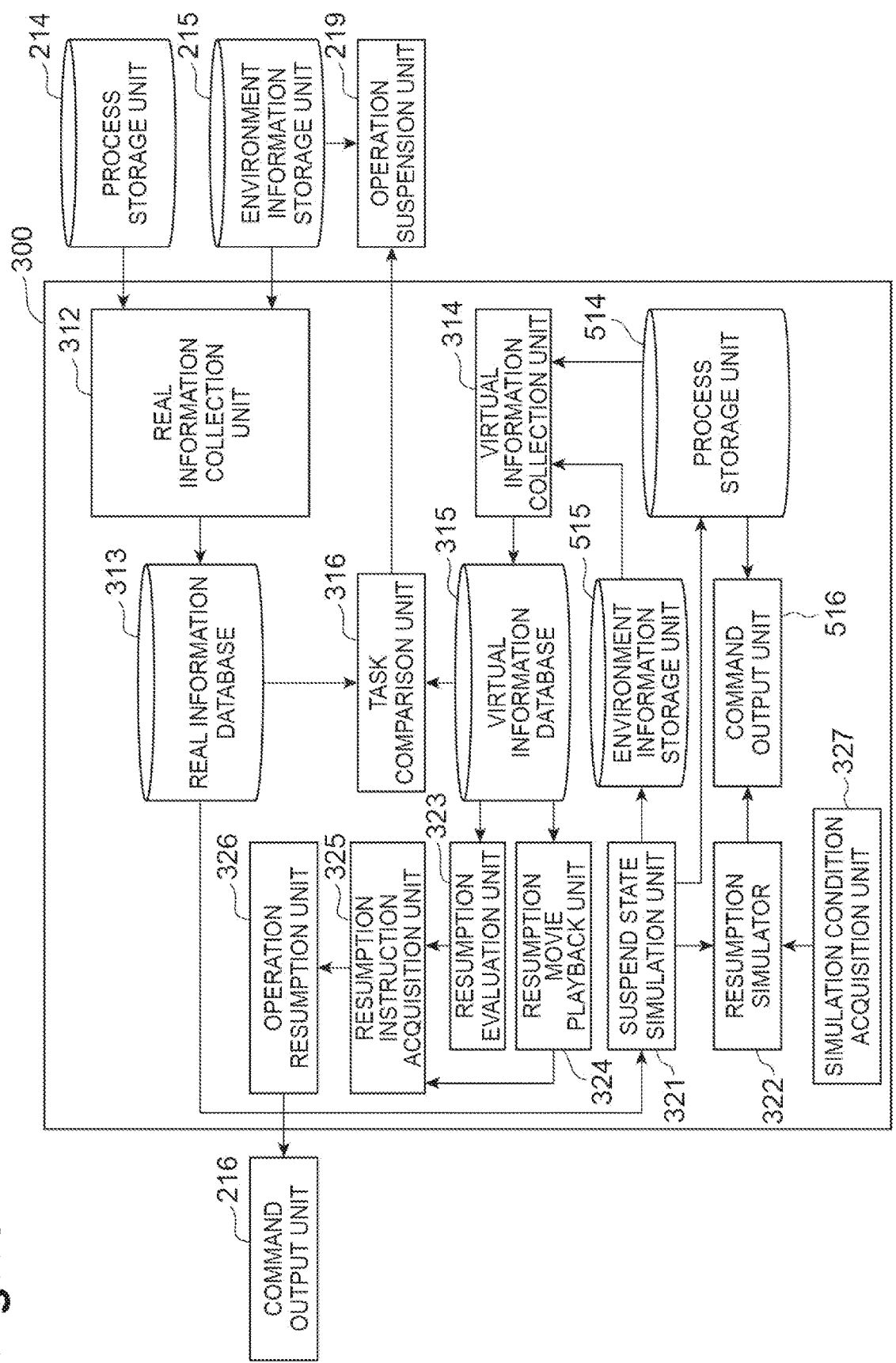
FIG. 13 is an example block diagram illustrating a configuration of the data management apparatus.

As shown in FIG. 13, the data management apparatus 300 further includes a real information collection unit 312, a real information database 313, a virtual information collection unit 314, a virtual information database 315, a suspend state simulation unit 321, and a resumption simulator 322.

The real information collection unit 312 collects real environment information from the environment information storage unit 215, and collects real progress information, which is progress information for each process in real space, from the process storage unit 214. The real information database 313 stores, in time series, a real data set in which real environment information collected by the real information collection unit 312 and real progress information are associated with each other.

The virtual information collection unit 314 collects virtual environment information and virtual progress information that is progress information for each process in a virtual space. As described with reference to FIG. 12, the virtual environment information is stored in the environment information storage unit 515, and the virtual progress information is stored in the process storage unit 514. Thus, the virtual information collection unit 314 may collect the virtual environment information from the environment information storage unit 515 and collect the virtual progress information from the process storage unit 514. The virtual information database 315 stores, in time series, a virtual data set in which the virtual environment information and the virtual progress information collected by the virtual information collection unit 314 are associated with each other.

The suspend state simulation unit 321 is configured to simulate a suspended state of the real space after suspension of the operation by the plurality of local devices 2, in the virtual space. For example, the suspend state simulation unit 321 simulates the suspended state of the real space in the virtual space based on the real environment information stored in the environment information storage unit 215. For example, the suspend state simulation unit 321 stores a copy of the latest real environment information collected from the environment information storage unit 215 by the real information collection unit 312 and accumulated in the real information database 313 in the environment information storage unit 515 as the latest virtual environment information. The suspend state simulation unit 321 stores a copy of the latest real progress information collected from the process storage unit 214 by the real information collection unit 312 and accumulated in the real information database 313 in the process storage unit 514 as the latest virtual progress information.

As described above, the real environment information may include the device information. The device information is an example of status information of the plurality of local devices 2 stored in the controller 6. Therefore, in a case where the real environment information includes the device information, the suspend state simulation unit 321 may further be configured to simulate the state of the real space in the virtual space based, at least in part, on the status information of the plurality of local devices 2 stored in the controller 6.

The real environment information may include information that is updated based, at least in part, on a detection result by the environmental sensor 5. In this case, the suspend state simulation unit 321 may further be configured to simulate the state of the real space in the virtual space based on the detection result by the environmental sensor 5.

The resumption simulator 322 is configured to resume at least a part of the operation by the plurality of local devices 2 based on the operation program, in the virtual space in which the suspended state of the real space has been simulated. For example, the resumption simulator 322 causes the virtual controller 7 to resume the operation of one or more virtual local devices 2v based on the operation program in the virtual space in which the suspend state simulation unit 321 simulates the state of the real space. The one or more virtual local devices 2v to be resumed include one or more virtual robots. For example, the resumption simulator 322 may further be configured to cause the virtual controller 7 to resume the operation by the plurality of local devices 2 based on the operation command after the suspension point of the operation.

For example, the resumption simulator 322 causes the command output unit 516 to start outputting the execution command of the next task while a copy of the latest real environment information is stored in the environment information storage unit 515 as the latest virtual environment information and a copy of the latest real progress information is stored in the process storage unit 514 as the latest virtual progress information. Thereafter, the virtual environment information stored in the environment information storage unit 515 and the virtual progress information stored in the process storage unit 514 are updated in accordance with the operation of one or more virtual local devices 2v in the virtual space.

Figure 6B:
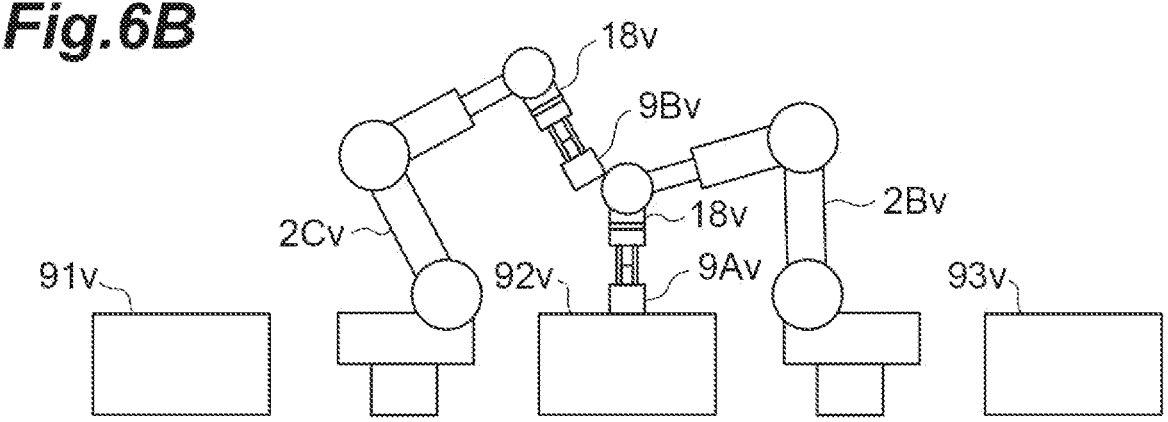

The resumption simulator 322 may further be configured to acquire operability information of each of the plurality of local devices 2 that have suspended the operation from the controller 6, and to resume at least a part of the operation by one or more operable virtual local devices 2v of the plurality of virtual local devices 2v corresponding to one or more operable local devices 2 of the plurality of local devices 2, while one or more inoperable virtual local devices 2v of the plurality of virtual local devices 2v corresponding to one or more inoperable local devices 2 of the plurality of local devices 2 are at rest (see FIG. 6B). For example, the resumption simulator 322 acquires the operability information of each of the plurality of local devices 2 based on the device information included in the latest real environment information.

The data management apparatus 300 may further include a resumption evaluation unit 323 and a resumption video playback unit 324. The resumption evaluation unit 323 is configured to evaluate the operation by the one or more virtual local devices 2v based on a predetermined evaluation condition. For example, the resumption evaluation unit 323 is configured to evaluate the operation of the one or more virtual local devices 2v resumed by the resumption simulator 322 based on predetermined evaluation conditions. For example, after one or more virtual local devices 2v resume the operation, the resumption evaluation unit 323 evaluates the operation of the virtual local devices 2v based on a virtual data set collected by the virtual information collection unit 314 and accumulated in the virtual information database 315.

Examples of the evaluation conditions are shown below.
Example 2-1) No virtual local device 2v collides with another virtual local device 2v: OK/one or more virtual local devices 2v collide with another virtual local device 2v: NG
Example 2-2) Any virtual local device 2v does not collide with the surrounding object: OK/one or more virtual local devices 2v collide with the surrounding object: NG
Example 2-3) No virtual local device 2v collides with a virtual workpiece 9v: OK/one or more virtual local devices 2v collide with a virtual workpiece 9v: NG For example, in a case where the resumption simulator 322 resumes the operation of one or more virtual local devices 2v corresponding to one or more local devices 2 that are operable in a state where one or more virtual local devices 2v corresponding to one or more local devices 2 that are inoperable are at rest, resumption evaluation unit 323 may further be configured to evaluate a presence or absence of a collision between the one or more inoperable virtual local devices 2v and one or more operable virtual local devices 2v.

The resumption evaluation unit 323 may further be configured to calculate an operable period after resuming the operation, for each of the one or more virtual local devices 2v based on the operation of the one or more virtual local devices 2v. For example, in the operation of one or more virtual local devices 2v, the resumption evaluation unit 323 calculates, as the operable period, a period in which the evaluation result based on the above-described evaluation conditions is OK.

The resumption video playback unit 324 is configured to graphically display a video of at least a part of the operation resumed by the one or more virtual robots. For example, the resumption video playback unit 324 is configured to display a video of the operation of one or more virtual local devices 2v resumed by the resumption simulator. For example, the resumption video playback unit 324 generates an animation of CG images of the plurality of virtual local devices 2v in the virtual space based on the virtual environment information collected by the virtual information collection unit 314 and stored in the virtual information database 315, the models of the plurality of virtual local devices 2v stored by the model storage unit 311, and the models of the surrounding environments of the plurality of virtual local devices 2v after the operations of one or more virtual local devices 2v resume, and displays the generated animation on a display device 395 described later.

The data management apparatus 300 may further include a resumption instruction acquisition unit 325 and an operation resumption unit 326. The resumption instruction acquisition unit 325 is configured to display a resumption instruction screen including the evaluation result by the resumption evaluation unit 323 and a resumption instruction input area on the display device 395 or the like described later. The resumption instruction acquisition unit 325 may display a resumption instruction screen further including a display window of a video played by the resumption video playback unit 324.

The operation resumption unit 326 is configured to cause the controller 6 to resume at least a part of the operations by the one or more local devices 2 based on the operation program based on the evaluation result of the operation resumed by the one or more virtual local devices 2v (the evaluation result by the resumption evaluation unit 323). The one or more local devices 2 to be resumed in the operation include one or more robots (e.g., robot 2B, 2C, or mobile robot 2D). For example, the operation resumption unit 326 outputs, to the command output unit 216, a resumption command for resuming at least a part of operations of one or more local devices 2 evaluated as OK by the resumption evaluation unit 323. In response to this, the command output unit 216 causes the local controllers 100 of the one or more local devices 2 to be resumed to resume the suspended task and resume the output of the execution command according to the progress of the task.

The operation resumption unit 326 may further be configured to cause the controller 6 to resume the operation of the one or more local devices 2 based on the operation program, based on an input to the resumption instruction input area in the resumption instruction screen (input by the user). As described above, the resumption instruction screen includes an indication of the evaluation result by the resumption evaluation unit 323 and an indication of the resumption instruction input area. Therefore, the user operates the resumption instruction input area based on the indication of the evaluation result by the resumption evaluation unit 323. Therefore, causing the controller 6 to resume the operation of the one or more local devices 2 based on the operation program based on the input to the resumption instruction input area in the resumption instruction screen is included in causing the controller to resume the operation of the one or more local devices 2 based on the operation program based on the evaluation result by the resumption evaluation unit 323.

Resuming at least a part of the operation by the one or more local devices 2 based on the operation program may include a first mode resumption in which at least a part of the operation is resumed by the one or more local devices 2 based on one or more operation commands positioned after a suspension point of the operation, and a second mode resumption in which at least a part of the operation is resumed by the one or more local devices 2 based on one or more operation commands positioned before the suspension point of the operation. The first mode resumption includes operating at least a part of the one or more local devices 2 based on the operation command positioned before the suspension point of the operation and the operation command positioned after the suspension point of the operation.

The second mode resumption includes operating at least a part of the two or more local devices 2 so as to return to the start position of the operation command based on the operation command before the suspension point of the operation. The resumption simulator 322 may cause the virtual controller 7 to resume the operation of the one or more virtual local devices 2v based on the operation program for each plurality of resumption modes including the first mode resumption and the second mode resumption. In this case, the resumption evaluation unit 323 may evaluate the operation of one or more virtual local devices 2v for each plurality of resumption modes.

The resumption instruction acquisition unit 325 may further be configured to display a resumption instruction screen including an evaluation result for each of the plurality of resumption modes by the resumption evaluation unit 323 and a resumption instruction input area capable of selecting any one of the plurality of resumption modes. An input to the resumption instruction input area may include a selection input for selecting one of the plurality of resumption modes. The resumption instruction acquisition unit 325 may further be configured to display a resumption instruction screen including an operable period for each of one or more local devices 2 and a resumption instruction input area capable of designating a resumption point. An input to the resumption instruction input area may include a designation input for designating the resumption point. The resumption instruction acquisition unit 325 may display a resumption instruction screen including an operable period for each of one or more local devices 2 and a resumption instruction input area capable of designating an end point of a resumed operation.

Figure 14:
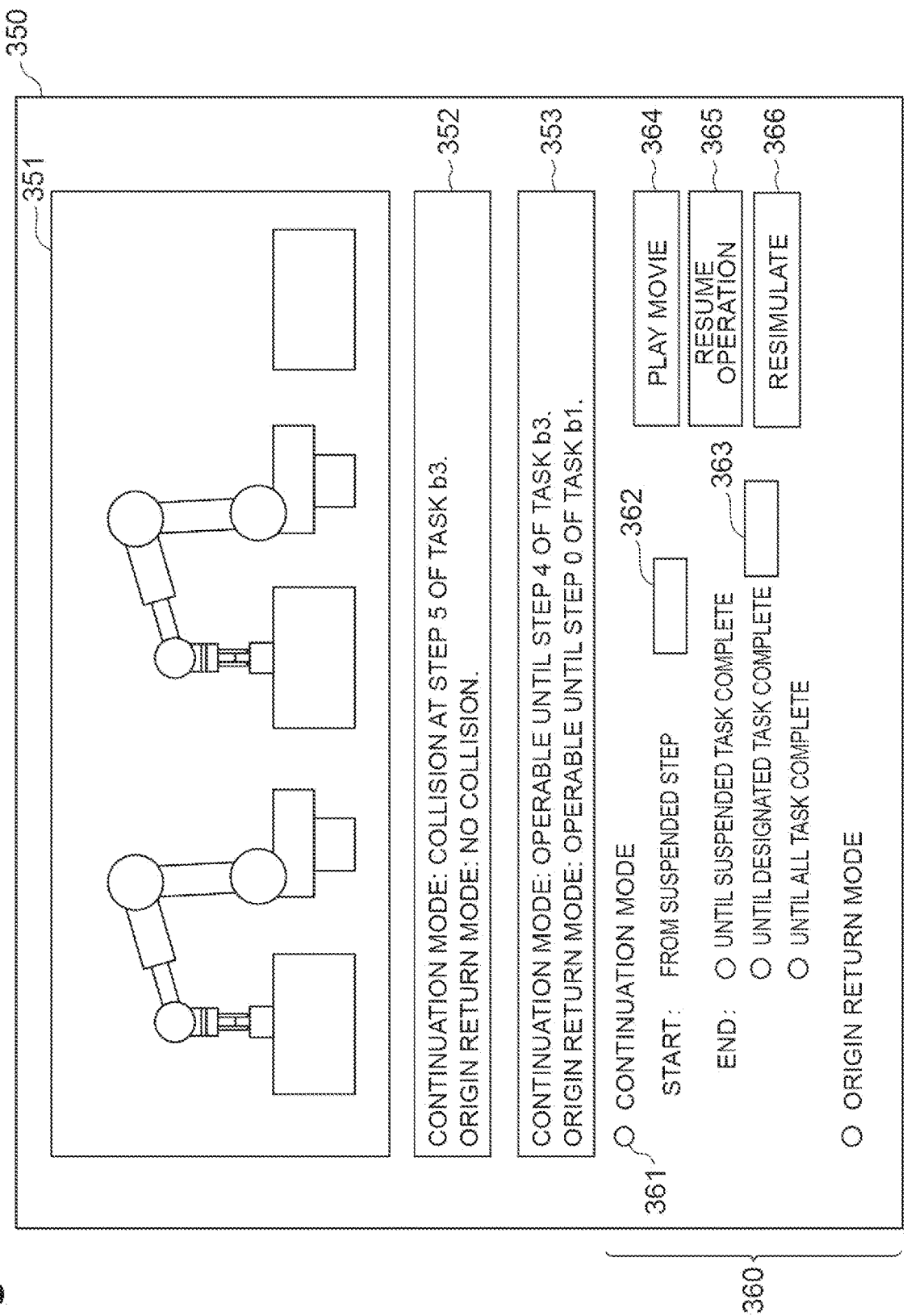
FIG. 14 is an example schematic diagram illustrating a resumption command acquire screen.

FIG. 14 is a schematic diagram illustrating a resumption instruction screen. The resumption instruction screen 350 shown in FIG. 14 includes a video window 351, an evaluation result window 352, an evaluation result window 353, and a resumption instruction input area 360.

A video window 351 is a window for displaying a video played back by the resumption video playback unit 324. The resumption video playback unit 324 plays back the video in the video window 351. An evaluation result window 352 is a window for displaying an evaluation result by the resumption evaluation unit 323. The resumption instruction acquisition unit 325 displays the evaluation result by the resumption evaluation unit 323 in the evaluation result window 352 in text or the like. The evaluation result window 353 is a window for displaying an operable period for each of one or more local devices 2 after resuming operation. The resumption instruction acquisition unit 325 derives an operable period based on the evaluation result from the resumption evaluation unit 323, and displays the derived result in the evaluation result window 353 in text or the like.

The resumption instruction input area 360 is an operational input area that instructs to resume the operation of one or more local devices 2. For example, the resumption instruction input area 360 includes a mode selection unit 361, a resumption point designation unit 362, an end point designation unit 363, a playback instruction button 364, and an operation resumption instruction button 365.

The mode selection unit 361 is an operational input area for selecting a resumption mode by, for example, a radio button. In the illustrated example, a "continuation mode" corresponding to the first mode and an "origin return mode" corresponding to the second mode can be selected. The origin return mode is a mode for returning to the start position of the first operation command in the operation program.

The resumption point designation unit 362 is an operational input area for inputting the resumption point of the operation in the continuation mode. For example, the resumption point designation unit 362 is an operational input area for inputting the number of steps after which the suspended step is resumed. Here, "step" means one operation which corresponds to one operation command.

An end point designation unit 363 is an operational input area for inputting an end point of operation in the continuation mode. In the illustrated example, one of "until completion of suspended task", "until completion of designated task", and "until completion of all tasks" can be selected by a radio button or the like. The end point designation unit 363 further includes an input area for inputting "designated task" in a case where "until completion of designated task" is selected.

A playback instruction button 364 is an operational input area for instructing playback of a video of an operation of one or more virtual local devices 2v. When the playback instruction button 364 is operated, the resumption video playback unit 324 displays, in the video window 351, a video of operations of one or more virtual local devices 2v based on inputs to the mode selection unit 361, the resumption point designation unit 362, and the end point designation unit 363. For example, in the playback mode selected by the mode selection unit 361, the resumption video playback unit 324 plays back, in the video window 351, a video of operation of one or more virtual local devices 2v from the resumption point designated by the resumption point designation unit 362 to the end point designated by the end point designation unit 363.

The operation resumption instruction button 365 is an operational input area for instructing to resume the operation of one or more local devices 2. The operation resumption unit 326 causes the controller 6 to resume the operation of the one or more local devices 2 based on the operation program in response to the operational input to the operation resumption instruction button 365. For example, in the playback mode selected by the mode selection unit 361, the operation resumption unit 326 may further be configured to cause the controller 6 to resume at least part of the operations of the one or more local devices 2 based on one or more operation commands positioned after the resumption point designated by the resumption point designation unit 362 and before the end point designated by the end point designation unit 363.

The resimulation instruction button 366 is an operational input area for instructing re-execution of the resumption simulation. In response to the operational input to the resimulation instruction button 366, the suspend state simulation unit 321 stores a copy of the latest real environment information in the real information database 313 to the environment information storage unit 515 again as the latest virtual environment information. The suspend state simulation unit 321 stores a copy of the latest real progress information in the real information database 313 in the process storage unit 514 again as the latest virtual progress information. Thereafter, the resumption simulator 322 causes the virtual controller 7 to resume the operation of the one or more virtual local devices 2v based on the operation program.

The data management apparatus 300 may further include a simulation condition acquisition unit 327. The simulation condition acquisition unit 327 is configured to display a simulation condition designation screen in which one of a plurality of resumption modes including the first mode and the second mode can be selected. For example, the simulation condition acquisition unit 327 is configured to display a simulation condition designation screen including a selection area for selecting a resumption mode from the plurality of resumption modes including the first mode and the second mode. In this case, the resumption simulator 322 causes the virtual controller 7 to resume the operation by the one or more local devices 2 in the resumption mode selected in the selection area. The simulation condition acquisition unit 327 may display a simulation condition designation screen capable of designating a simulation start point in the operation program. The simulation condition acquisition unit 327 may display a simulation condition designation screen capable of designating a simulation end point in the operation program.

Figure 15:
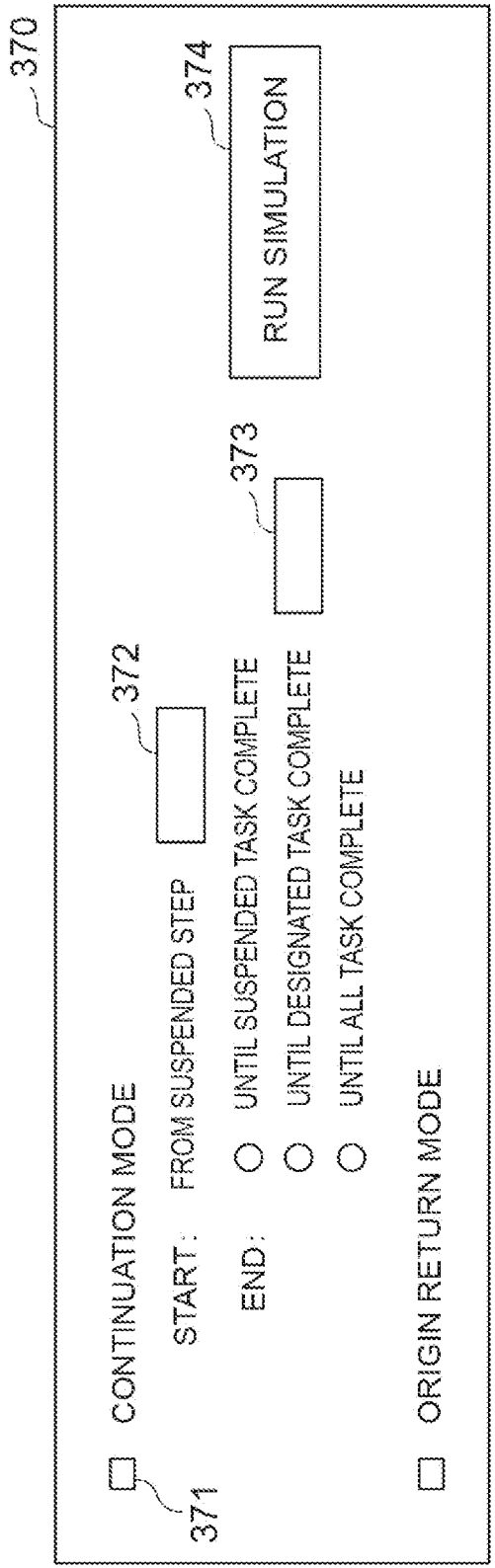
FIG. 15 is an example schematic diagram illustrating a simulation condition designation screen.

FIG. 15 is a schematic diagram illustrating a simulation condition designation screen. The simulation condition designation screen 370 shown in FIG. 15 includes a mode selection area 371, a start point designation area 372, an end point designation area 373, and a simulation instruction button 374.

The mode selection area 371 is an operational input area for selecting a resumption mode by, for example, a radio button. In the illustrated example, the "continuation mode" corresponding to the first mode and the "origin return mode" corresponding to the second mode can be selected.

The start point designation area 372 is an operational input area for inputting the resumption point of the operation in the continuation mode. For example, the start point designation area 372 is an operational input area for inputting the number of steps after which the suspended step is resumed.

An end point designation area 373 is an operational input area for inputting an end point of operation in the continuation mode. In the illustrated example, one of "until completion of suspended task completion", "until completion of designated task", and "until completion of all tasks" by a radio button or the like. The end point designation unit 373 further includes an input area for inputting "designated task" when "until completion of designated task" is selected.

The simulation instruction button 374 is an operational input area for instructing to resume the operation of one or more virtual local devices 2v. The resumption simulator 322 causes the virtual controller 7 to resume the operation of the one or more virtual local devices 2v based on the operation program in response to the operational input to the simulation instruction button 374. For example, in the reproduction mode selected by the mode selection unit 371, the resumption simulator 322 may further be configured to cause the virtual controller 7 to resume the operation by the one or more virtual local devices 2v based on one or more operation commands positioned after the start point designated by the start point designation unit 372 and before the end point designated by the end point designation unit 373.

The simulation condition acquisition unit 327 may display the simulation condition designation screen 370 again when the resimulation instruction button 366 is operated after the simulation.

The real environment data accumulated in the real information database 313 and the virtual environment data accumulated in the virtual information database 315 can be used to determine whether to suspend the operation of the plurality of local devices 2. For example, the operation suspension unit 219 may further be configured to suspend the operation of the plurality of local devices 2 by the controller 6 in response to detecting a difference between the state of the real space during the operation of the plurality of local devices 2 based on the operation program and the state of the virtual space during the operation of the plurality of virtual local devices 2v based on the operation program.

For example, the data management apparatus 300 further includes a task comparison unit 316. The task comparison unit 316 compares the real environment information accumulated in the real information database 313 with the virtual environment information accumulated in the virtual information database 315 for each progress of each process. The comparison for each progress of the process means that the real environment information and the virtual environment information are compared between the real data set and the virtual data set in which the real progress information and the virtual progress information match each other.

The operation suspension unit 219 suspends the operation of the plurality of local devices 2 by the controller 6 when detecting the difference between the state of the real space and the state of the virtual space based on the comparison result of the task comparison unit 316.

Figure 16:
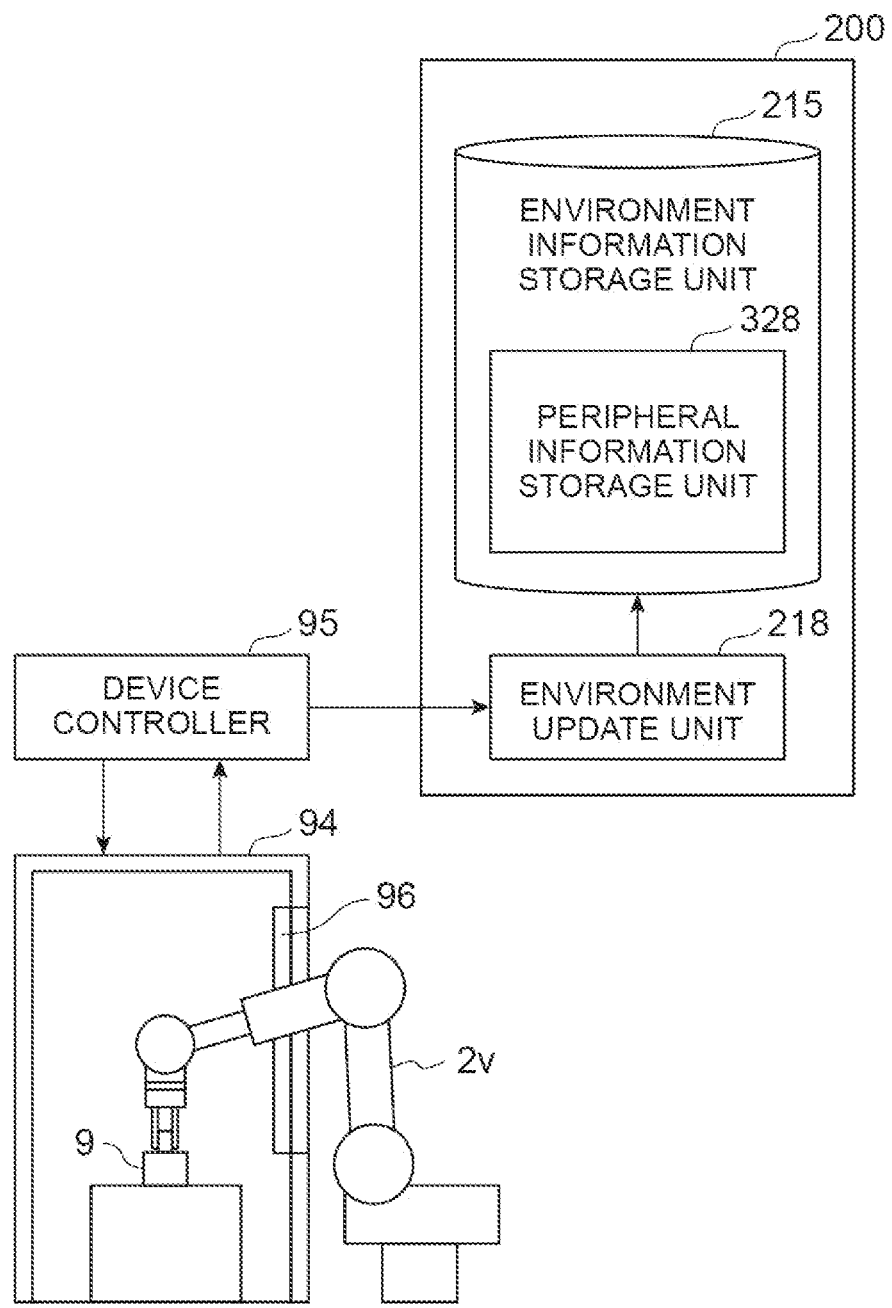
FIG. 16 is an example block diagram showing a modification of the data management apparatus.

As shown in FIG. 16, the environment information storage unit 215 may include a peripheral information storage unit 328. The peripheral information storage unit 328 configured to store peripheral behavior information indicating how another machine operates after suspension of the operation by the plurality of local devices 2. For example, the peripheral behavior information may indicate how a second controller operates the other machine after suspension of the operation by the plurality of local devices 2. In this case, the resumption evaluation unit 323 may further be configured to evaluate the operation of one or more virtual local devices 2v further based on the peripheral behavior information.

FIG. 16 shows a processing apparatus 94 such as a NC processing apparatus as an example of the other machine, and a device controller 95 for controlling the processing apparatus 94 as an example of the second controller. The processing apparatus 94 has a door 96 for moving the workpiece 9 in and out. For example, when the virtual local device 2v resumes the operation of loading or unloading the workpiece 9 into or from the processing apparatus 94, if it is unknown whether or not the door 96 is opened, it cannot be evaluated whether or not the virtual local device 2v collides with the door 96.

An example of peripheral behavior for the processing apparatus 94 is shown below.

Example 3-1) If the operation of the plurality of local devices 2 is suspended, the processing apparatus 94 completes the currently executed processing and waits with the door 96 opened.

Example 3-2) If the operation of the plurality of local devices 2 is suspended, the processing apparatus 94 completes the processing currently being executed, waits with the door 96 opened, and opens the door 96 as soon as the operation of one or more local devices 2 resumes.

Example 3-3) If the operation of the plurality of local devices 2 is suspended, the processing apparatus 94 suspends the processing immediately, and resumes processing after the operation of one or more local devices 2 is resumed.

Based on the peripheral behavior information, when the virtual local device 2v resumes the operation of loading or unloading the workpiece 9 into or from the processing apparatus 94, it can be determined whether the door 96 is open, and the operation of the virtual local device 2v can be evaluated based on the determination result. The environment update unit 218 acquires the peripheral behavior information from the device controller 95 by synchronous communication or asynchronous communication, and stores the peripheral behavior information in the environment information storage unit 215.

Figure 17:
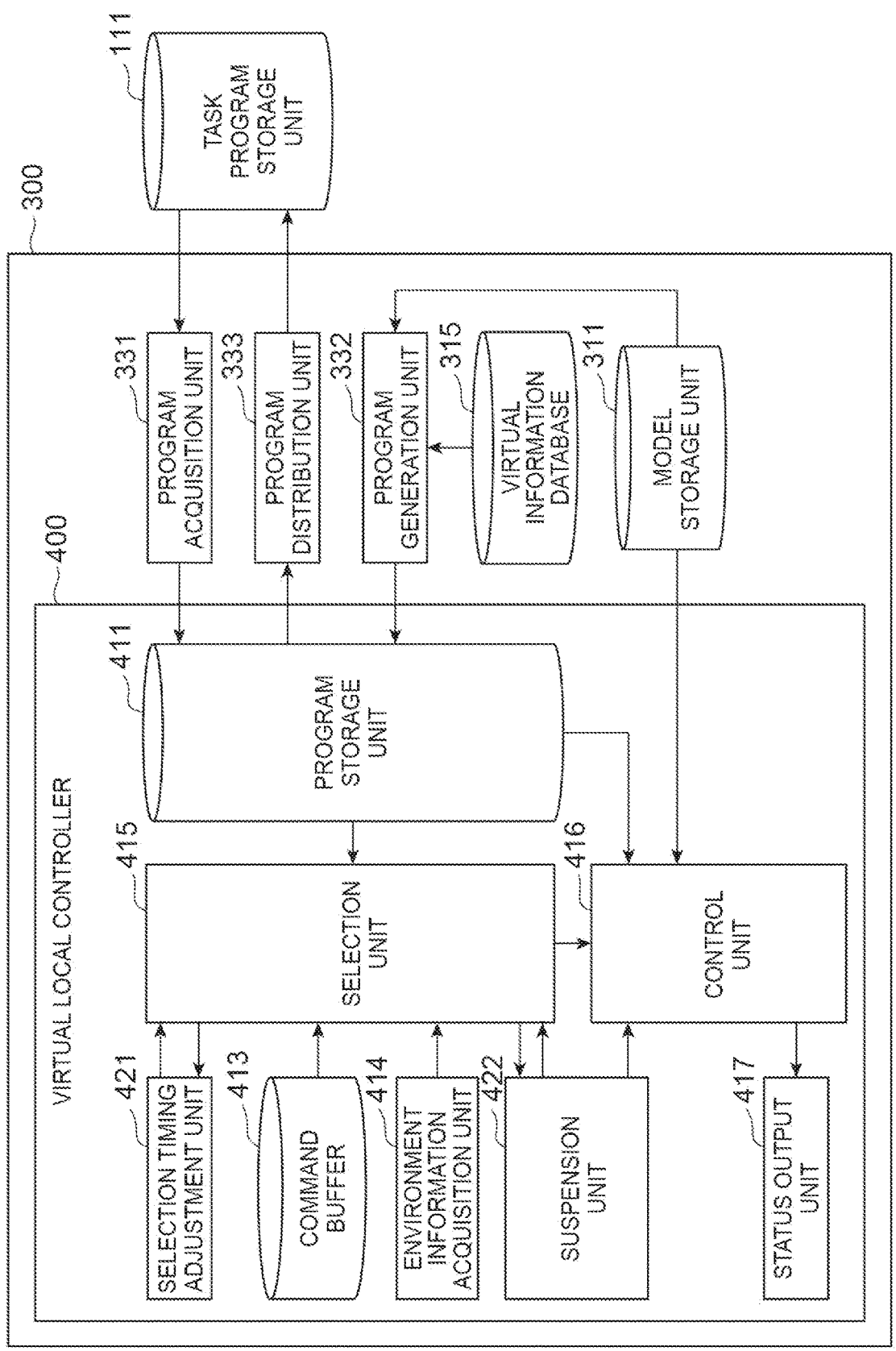
FIG. 17 is an example schematic diagram showing a modification of the production system.

As shown in FIG. 17, the data management apparatus 300 may further include a program acquisition unit 331, a program generation unit 332, and a program distribution unit 333 as functional blocks.

The program acquisition unit 331 acquires the operation program registered by teaching in each local controller 100, and stores it in the program storage unit 411 of the virtual local controller 400.

The program generation unit 332 is configured to repeat, until the operation of one or more virtual local devices 2v satisfies a predetermined condition, a number of operations comprising: causing the virtual controller 7 to operate the plurality of virtual local devices 2v based on the operation program acquired by the program acquisition unit 331; and modifying the operation program of the program storage unit 411 based on the virtual environment information during the operation by the plurality of virtual local devices 2v. Hereinafter, this predetermined condition is referred to as a "program establishment condition".

Examples of the program establishment condition include that any virtual local device 2v does not collide with another virtual local device 2v, that any virtual local device 2v does not collide with a peripheral object, and that any virtual local device 2v has an operation trajectory (path) that does not collide with (or interfere with) the virtual workpiece 9v. Hereinafter, the program modified by the program generation unit 332 based on the motion trajectory (path) generated in the program storage unit 411 by such a path planning for interference avoidance is referred to as a "generated program".

The program distribution unit 333 outputs the generated program of the program storage unit 411 to the corresponding local controller 100, and stores the generated program in the program storage unit 111 of the local controller 100. For example, the program distribution unit 333 outputs the generated program to the corresponding local controller 100 via the host controller 200. The local controller 100 operates the local device 2 under control based on the generated program.

Figure 18:
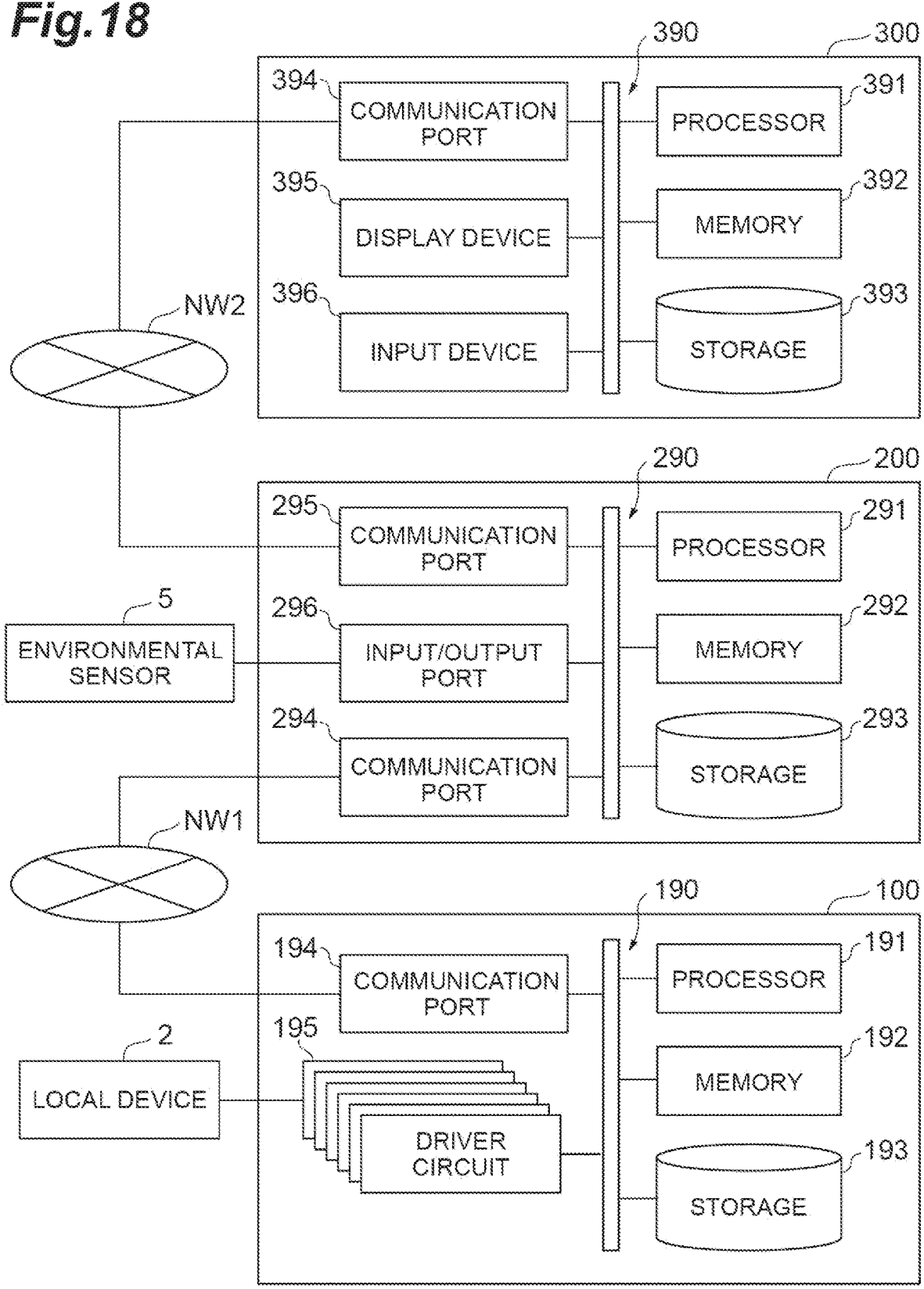
FIG. 18 is an example diagram illustrating a hardware configuration of a control system.

FIG. 18 is a block diagram illustrating a hardware configuration of the control system 3. As shown in FIG. 18, the host controller 200 includes circuitry 290. The circuitry 290 includes one or more processors 291, a memory 292, storage 293, communication ports 294 and 295, and input/output ports 296. The storage 293 includes a computer-readable storage medium such as a nonvolatile semiconductor memory. The storage 293 stores a program for causing the host controller 200 to: operate the plurality of local devices 2 based on the operation program in real space; and suspend the operation of the plurality of local devices 2. For example, the storage 293 stores a program for causing the host controller 200 to configure the above-described functional blocks.

The memory 292 temporarily stores a program loaded from the storage medium of the storage 293 and an operation result by the processor 291. The processor 291 executes the program in cooperation with the memory 292 to configure each functional block of the host controller 200. The communication port 294 communicates with the local controller 100 via the first communication network NW1 in accordance with an instruction from the processor 291. The communication port 295 communicates with the data management apparatus 300 via the second communication network NW2 in accordance with an instruction from the processor 291. The input/output port 296 inputs and outputs information to and from the environmental sensor 5 in accordance with an instruction from the processor 291.

The local controller 100 includes circuitry 190. The circuitry 190 includes one or more processors 191, a memory 192, storage 193, a communication port 194, and a driver circuit 195. The storage 193 includes a computer-readable storage medium such as a nonvolatile semiconductor memory. The storage 193 stores a program for causing the local controller 100 to configure the above-described functional blocks.

The memory 192 temporarily stores a program loaded from the storage medium of the storage 193 and an operation result by the processor 191. The processor 191 executes the program in cooperation with the memory 192 to configure each functional block of the local controller 100. The communication port 194 communicates with the host controller 200 via the first communication network NW1 in accordance with an instruction from the processor 191. The driver circuit 195 outputs driving power to the local device 2 in accordance with a command from the processor 191.

The data management apparatus 300 includes circuitry 390. The circuitry 390 includes one or more processors 391, a memory 392, storage 393, a communication port 394, a display device 395, and an input device 396. The storage 393 includes a computer-readable storage medium such as a nonvolatile semiconductor memory. The storage 393 stores a program for causing the data management apparatus 300 to: simulate the suspended state of the real space after suspension of the operation by the plurality of local devices 2 in the virtual space; and cause the virtual controller to resume the operation by the plurality of virtual local devices based on the operation program in the virtual space in which the suspended state of the real space is simulated. For example, the storage 393 stores a program for configuring the above-described functional blocks in the data management apparatus 300.

The memory 392 temporarily stores a program loaded from the storage medium of the storage 393 and an operation result by the processor 391. The processor 391 executes the program in cooperation with the memory 392 to configure each functional block of the data management apparatus 300. The communication port 394 communicates with the host controller 200 via the second communication network NW2 in accordance with an instruction from the processor 391. The display device 395 and the input device 396 function as user interfaces of the data management apparatus 300. The display device 395 includes, for example, a liquid crystal monitor, and is used to display information to the user. The input device 396 is, for example, a keypad, and acquires information input by a user. The display device 395 and the input device 396 may be integrated as a so-called touch panel. The display device 395 and the input device 396 may be provided in an external device connected to the data management apparatus 300 or may be incorporated in the data management apparatus 300.

It should be noted that the circuitry 190, 290, and 390 are not necessarily limited to the configuration in which each function is configured by a program. For example, at least a part of the functions of the circuitry 190, 290, and 390 may be configured by dedicated logic circuitry or an application specific integrated circuit (ASIC) in which the dedicated logic circuitry is integrated. Each of the local controller 100, the host controller 200, and the data management apparatus 300 may include a plurality of computers capable of communicating with each other, and each of the computers may include circuitry. For example, the data management apparatus 300 may include a plurality of computers including a data collection apparatus and a simulation apparatus. In this case, the functional blocks of the data management apparatus 300 may be distributed to a plurality of computers. For example, the simulation apparatus may include a virtual local controller 400, a virtual host controller 500, a model storage unit 311, a program acquisition unit 331, a program generation unit 332, a program distribution unit 333, a suspend state simulation unit 321, a resumption simulator 322, a resumption evaluation unit 323, a resumption video playback unit 324, a resumption instruction acquisition unit 325, an operation resumption unit 326, and a simulation condition acquisition unit 327, and the data collection apparatus may include a real information collection unit 312, a real information database 313, a virtual information collection unit 314, a virtual information database 315, and a comparison task acquisition unit 316. The data collection device may further collect and store the task program 130 and the control parameters of each local controller 100, and deliver the task program 130 to each local controller 100. In this case, the program acquisition unit 331 may acquire the task program 130 from the local controller 100 via the data acquisition device. The program distribution unit 333 may output the generated program to the local controller 100 via the data collection device. Further, the simulation apparatus may be configured in a single computer by a program integrating functions as the simulation apparatus, and the data collection apparatus may be configured in the same single computer by a program integrating functions as the data collection apparatus.

Control Procedure

As an example of the control method, a control procedure performed by the control system 3 is shown. The procedure includes: operating one or more robots in the real space based on the operation program; suspending the operation by one or more robots; simulating the suspended state of the real space after suspension of the operation by one or more robots in the virtual space; and resuming the operation by one or more virtual robots by a virtual controller based on the operation program in the virtual space in which the suspended state of the real space is simulated.

An example of the control procedure will be described below. The control procedure according to this example includes a program generation procedure by the data management apparatus 300, a control procedure by the host controller 200, a control procedure by the local controller 100, a data management procedure by the data management apparatus 300, and an operation resumption procedure by the host controller 200. Hereinafter, each procedure will be described in detail.

Program Generation Procedure

Figure 19:
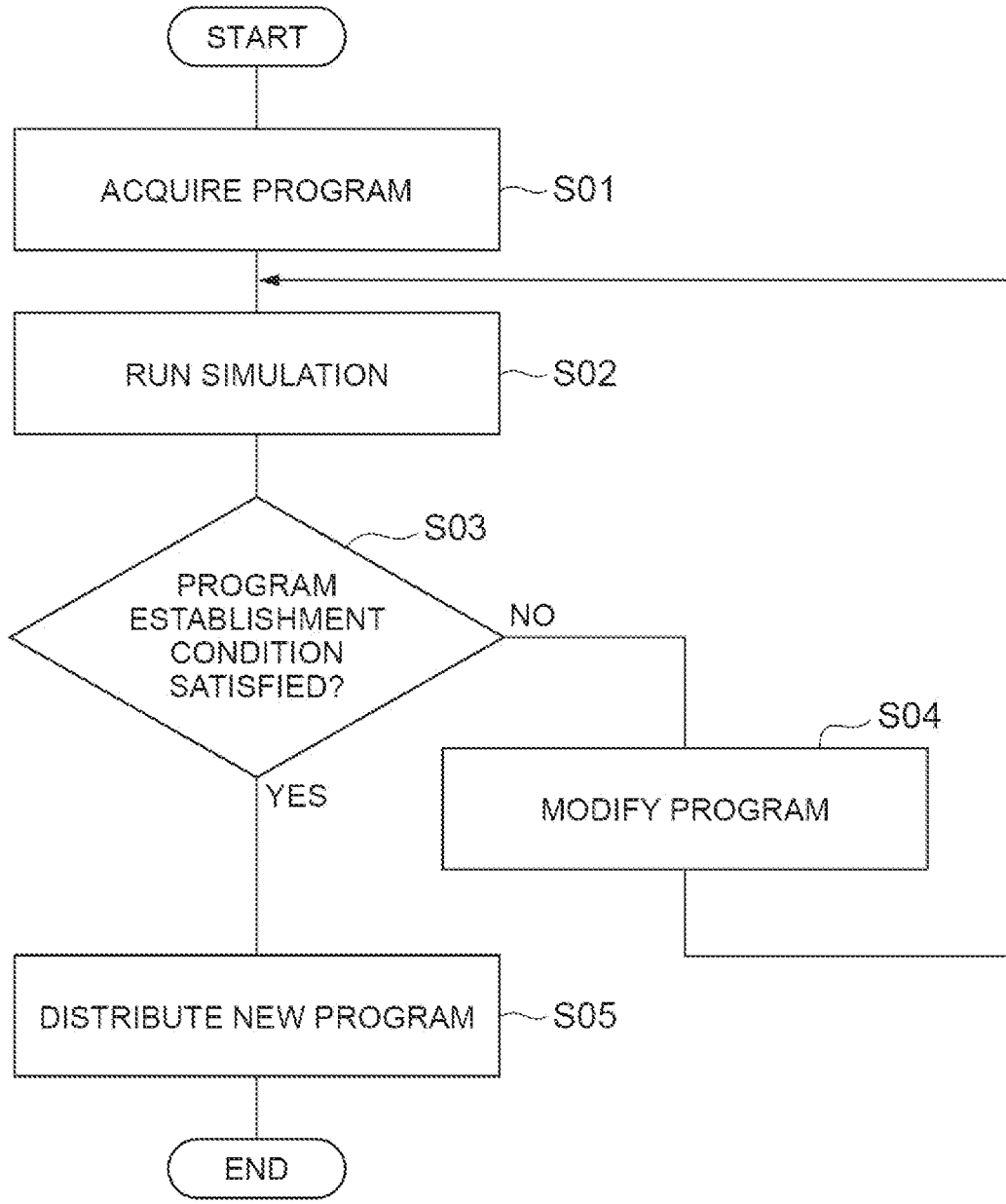
FIG. 19 is an example flowchart illustrating a program generation procedure.

As shown in FIG. 19, the data management apparatus 300 first executes operations S01, S02, and S03. In operation S01, the program acquisition unit 331 acquires the operation program registered by teaching in each local controller 100, and stores the operation program in the program storage unit 411 of the virtual local controller 400.

In operation S02, the program generation unit 332 causes the virtual controller 7 to operate the plurality of virtual local devices 2v based on the operation program acquired by the program acquisition unit 331. During the operation of the virtual local device 2v, the virtual information collection unit 314 accumulates the virtual data set in the virtual information database 315.

In operation S03, the program generation unit 332 confirms whether or not the operations of the plurality of virtual local devices 2v satisfy the program establishment condition based on the virtual data set accumulated in the virtual information database 315.

If it is determined in operation S03 that the operations of the plurality of virtual local devices 2v do not satisfy the program establishment condition, the data management apparatus 300 executes operation S04. In operation S04, the program generation unit 332 modifies the operation program of the program storage unit 411 based on the virtual data set (virtual environment information during the operation of the plurality of virtual local devices 2v) stored in the virtual information database 315. Thereafter, the data management apparatus 300 returns the process to operation S01. Thereafter, the data management apparatus 300 repeats, until the operations of the plurality of virtual local devices 2v satisfy the program establishment condition, operating the plurality of virtual local devices 2v by the virtual controller 7; checking whether the operations of the plurality of virtual local devices 2v satisfy the program establishment condition, and modifying the operation program of the program storage unit 411 based on the virtual environment information during the operations of the plurality of virtual local devices 2v.

If it is determined in operation S03 that the operations of the plurality of virtual local devices 2v satisfy the program establishment condition, the data management apparatus 300 executes operation S05. In operation S05, the program distribution unit 333 outputs the generated program of the program storage unit 411 to the corresponding local controller 100 and stores the generated program in the program storage unit 111 of the local controller 100. This completes the program generation procedure.

Control Procedure by Host Controller

Figure 20:
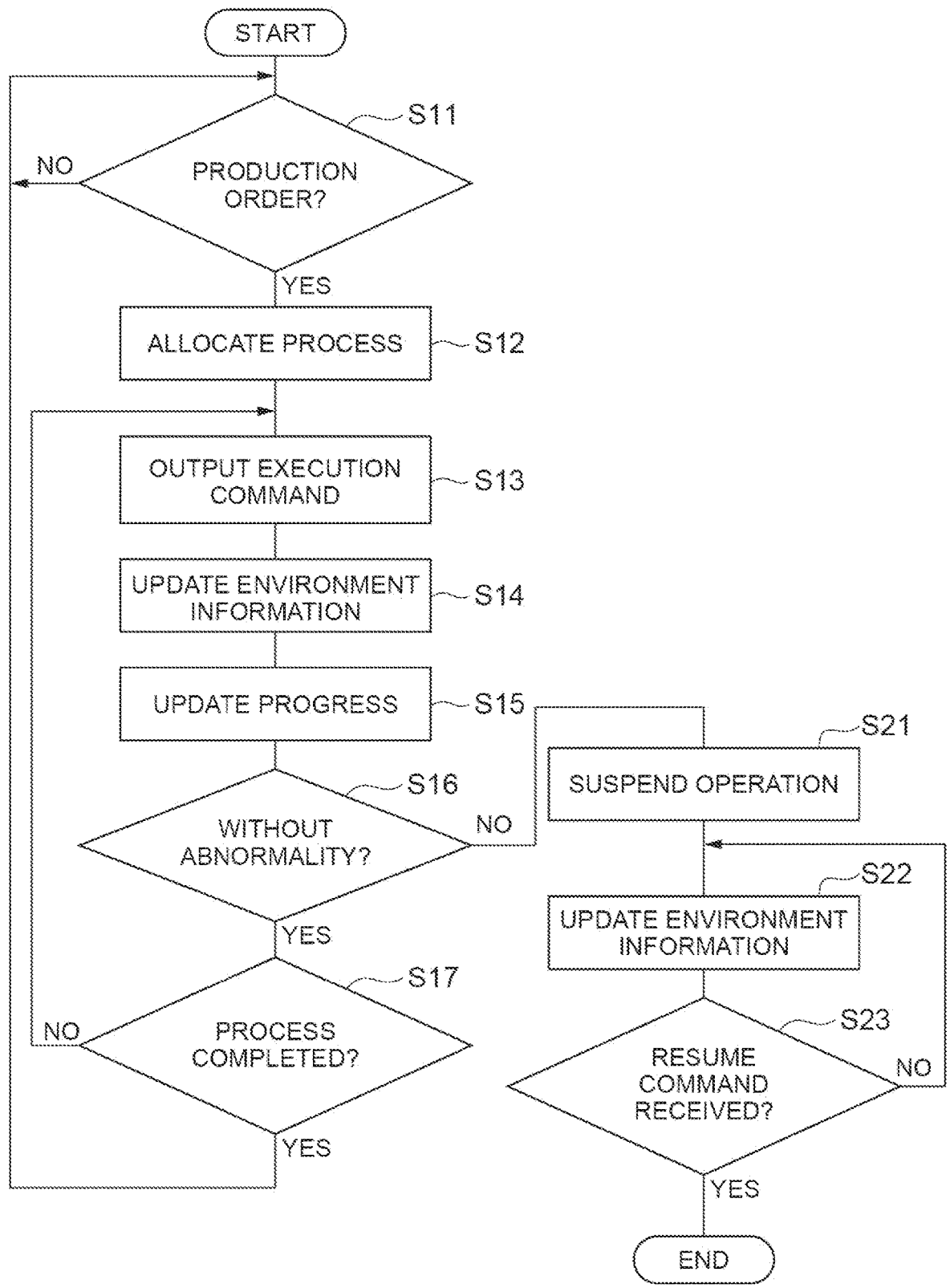
FIG. 20 is an example flowchart illustrating a control procedure by a host controller.

As shown in FIG. 20, the host controller 200 first executes operations S11, S12, S13, S14, S15, and S16. In operation S11, the order acquisition unit 212 waits for acquisition of a production order from the production management controller 4. In operation S12, the process allocation unit 213 allocates a process to the workpiece 9 designated by the production order and stores the allocated process in the process storage unit 214. In operation S13, the command output unit 216 outputs an execution command of the next task based on the process stored by the process storage unit 214, the progress information of the process, and the real environment information stored in the environment information storage unit 215.

In operation S14, the environment update unit 218 acquires the status information of the local device 2 from each of the plurality of local controllers 100, acquires the detection result of the environmental sensor 5, and updates the environment information based on the status information and the detection result. In operation S15, the progress update unit 217 updates the progress information of the process storage unit 214 in response to the task completion notification included in the status information acquired in operation S14. If the status information does not include a task completion notification, the progress information is not changed. In operation S16, the operation suspension unit 219 checks whether there is any abnormality in the plurality of local devices 2. A procedure for confirming the abnormality will be described separately.

If it is determined in operation S16 that there is no abnormality in any of the plurality of local devices 2, the host controller 200 executes operation S17. In operation S17, the command output unit 216 checks whether the process assigned to the workpiece 9 in the process storage unit 214 is completed. For example, the command output unit 216 checks whether all tasks in the process storage unit 214 have been completed.

If it is determined in operation S17 that there remains a task that has not been completed, the host controller 200 returns the process to operation S13. Thereafter, the host controller 200 repeats operations S13 to S17 in a synchronous communication cycle of a predetermined period, for example, until all tasks in the process storage unit 214 are completed.

If it is determined in operation S17 that all tasks have been completed, the host controller 200 returns the process to operation S11.

Thereafter, the host controller 200 repeatedly executes the above processing as long as abnormality does not occur in any of the plurality of local devices 2.

If it is determined in operation S16 that there is abnormality in any of the plurality of local devices 2, the host controller 200 executes operations S21, S22, and S23. In operation S21, the operation suspension unit 219 suspends the operation of the plurality of local devices 2. For example, the operation suspension unit 219 causes the command output unit 216 to suspend the output of the execution command and causes each of the plurality of local controllers 100 to suspend the task being executed.

In operation S22, the environment update unit 218 acquires the status information of the local device 2 from each of the plurality of local controllers 100, acquires the detection result of the environmental sensor 5, and updates the environment information based on the status information and the detection result. In operation S23, the command output unit 216 checks whether an operation resumption command is output from the operation resumption unit 326.

If it is determined in operation S23 that the operation resumption command has not been output from the operation resumption unit 326, the local controller 100 returns the process to operation S22. Thereafter, the update of the environment information of the environment information storage unit 215 is repeated until the resumption instruction of the operation is output from the operation resumption unit 326. Thus, the state change of the real space corresponding to the input by the user during the suspend of the operation is continuously reflected in the environment information. When it is determined in operation S23 that the resumption instruction of the operation is output from the operation resumption unit 326, the progress management procedure before the resumption of the operation is completed.

Figure 21:
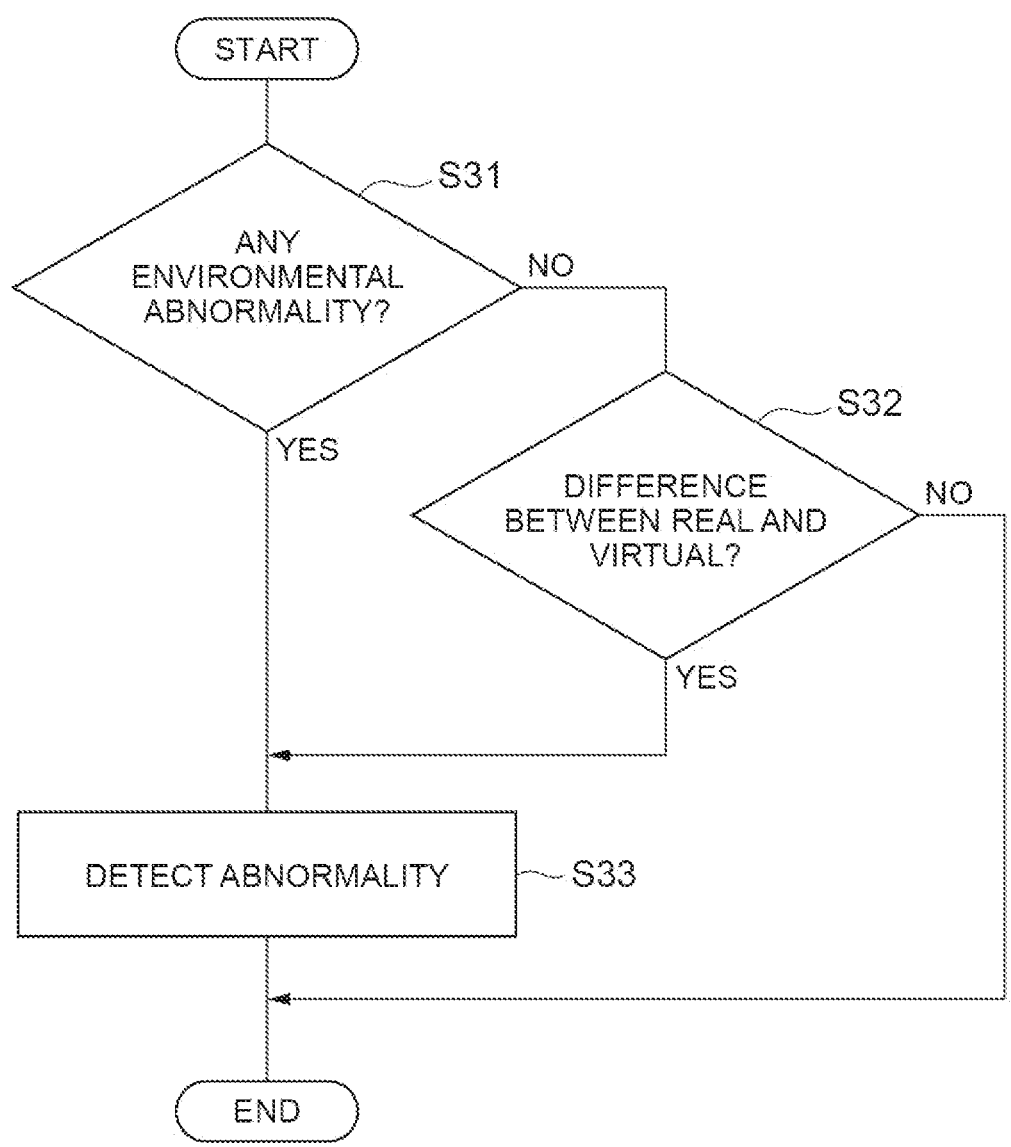
FIG. 21 is an example flowchart illustrating an abnormality check procedure by the host controller.

FIG. 21 is a flowchart illustrating the abnormality confirmation procedure in operation S16. As shown in FIG. 21, the host controller 200 first executes operation S31. In operation S31, the operation suspension unit 219 checks whether there is an abnormality in any of the plurality of local devices 2 based on the environment information stored in the environment information storage unit 215.

If it is determined in operation S31 that there is no abnormality in any of the plurality of local devices 2, the host controller 200 executes operation S32. In operation S32, the operation suspension unit 219 checks whether there is a difference between the state of the real space and the state of the virtual space based on the comparison result by the task comparison unit 316.

If it is determined in operation S31 that there is an abnormality in any of the plurality of local devices 2, and if it is determined in operation S32 that there is a difference between the state of the real space and the state of the virtual space, the host controller 200 executes operation S33. In operation S33, the operation suspension unit 219 detects an abnormality of any of the plurality of local devices 2.

If it is determined in operation S32 that there is no difference between the state of the real space and the state of the virtual space, the operation suspension unit 219 completes the abnormality check without detecting the abnormality.

Control Procedure by Local Controller 100

Figure 22:
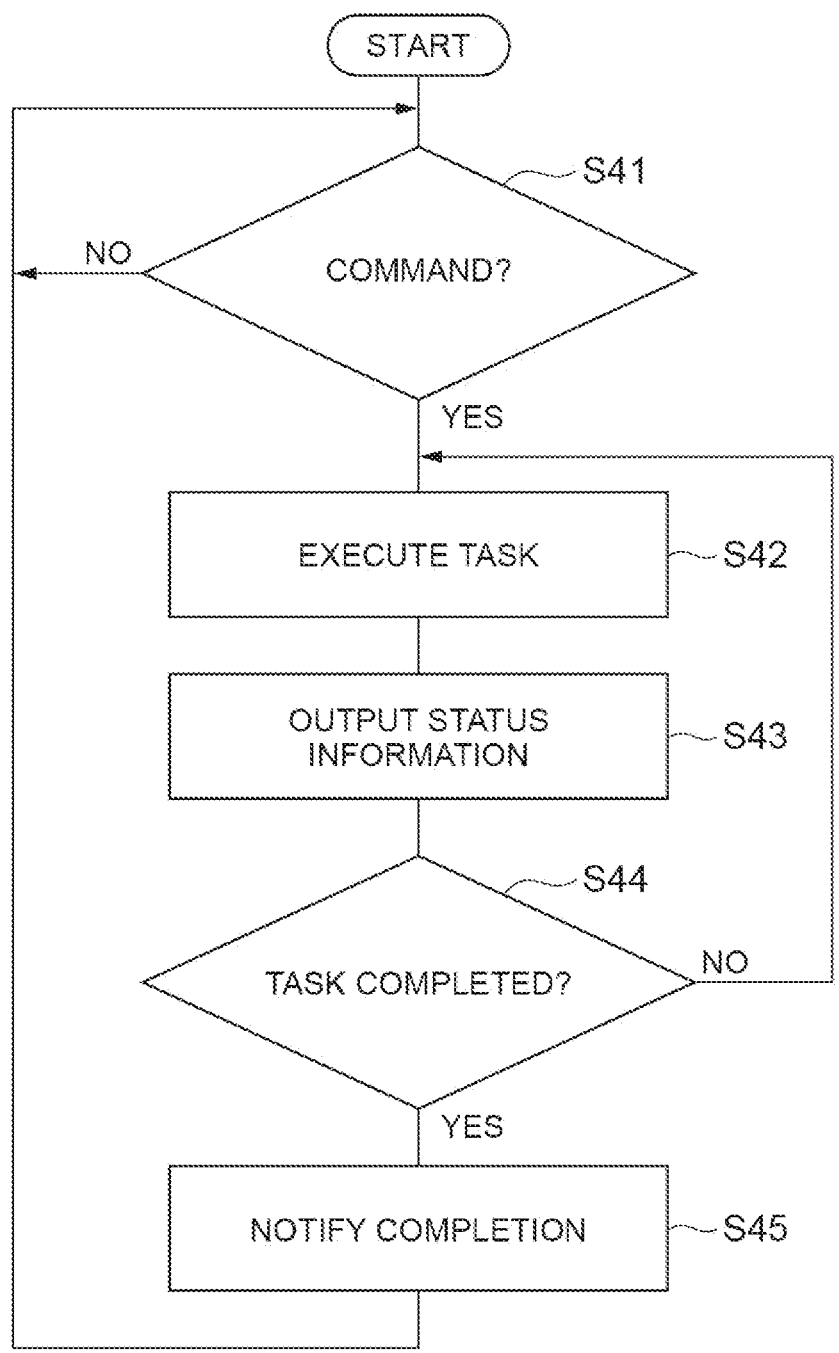
FIG. 22 is an example flowchart illustrating a control procedure by a local controller.

As shown in FIG. 22, the local controller 100 first executes operations S41, S42, S43, and S44. In operation S41, the control unit 112 waits for an execution command of the next task. In operation S42, the control unit 112 operates the local device 2 to execute 1 control cycles of the next task. In operation S43, the status output unit 113 outputs the status information of the local device 2 to the host controller 200. In operation S44, the control unit 112 checks whether the execution of the next task is completed.

If it is determined in operation S44 that the execution of the next task is not completed, the local controller 100 returns the process to operation S42. Thereafter, the local controller 100 repeats operations S42 to S44 in a control cycle of a predetermined period until the execution of the next task is completed. The control cycle may be synchronized with the synchronous communication cycle.

If it is determined in operation S44 that the execution of the next task is completed, the local controller 100 executes operation S45. In operation S45, the status output unit 113 includes the completion notification of the next task in the status information and outputs the status information to the host controller 200. Thereafter, the local controller 100 returns the process to operation S41. The local controller 100 repeats the above processing.

Data Management Procedure

The data management procedure executed by the data management apparatus 300 includes a virtual environment information collection procedure, a real environment information collection procedure, and a resumption simulation procedure. Hereinafter, each procedure will be described in detail.

Virtual Environment Information Collection Procedure

Figure 23:
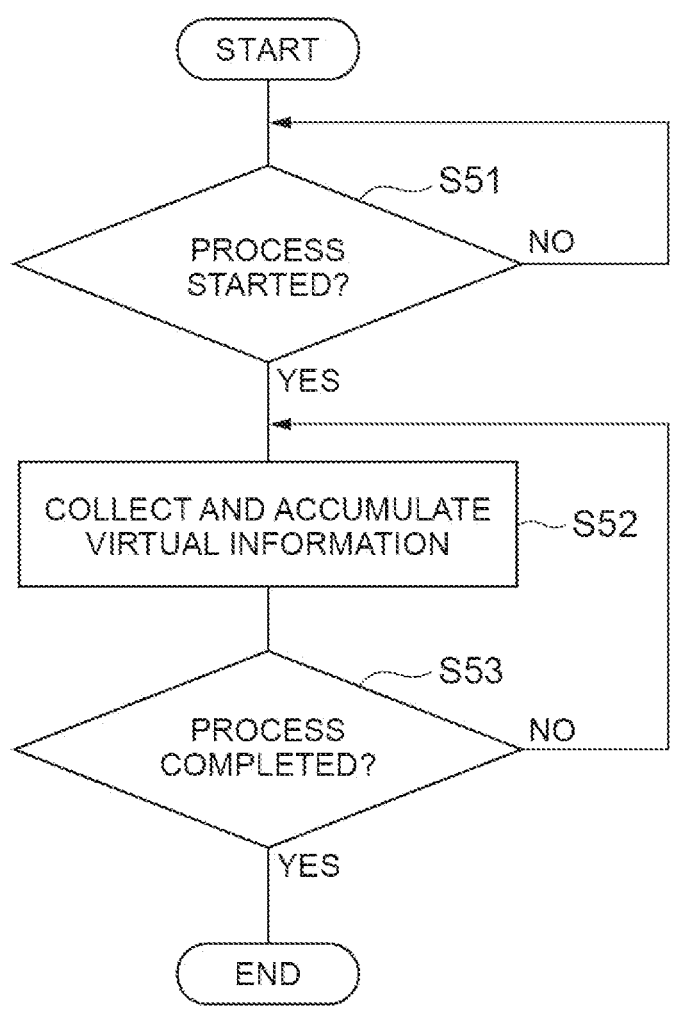
FIG. 23 is an example flowchart illustrating a virtual environment information collection procedure.

As shown in FIG. 23, the data management apparatus 300 sequentially executes S51, S52, and S53. In operation S51, the virtual information collection unit 314 waits for the virtual host controller 500 to start execution of the process corresponding to the production order.

In operation S52, the virtual information collection unit 314 acquires virtual environment information from the environment information storage unit 515, acquires virtual progress information, which is progress information for each process in the virtual space, from the process storage unit 514, and stores a virtual data set in which the virtual environment information and the virtual progress information are associated in the virtual information database 315. In operation S53, the virtual information collection unit 314 checks whether the execution of the process by the virtual host controller 500 is completed.

If it is determined in operation S53 that the execution of the process by the virtual host controller 500 is not completed, the data management apparatus 300 returns the process to operation S52. Thereafter, the data management apparatus 300 repeats the acquisition and accumulation of the virtual data set until the execution of the process by the virtual host controller 500 is completed. If it is determined in operation S53 that the execution of the process by the virtual host controller 500 is completed, the procedure of collecting the virtual environment information is completed.

Real Environment Information Collection Procedure

Figure 24:
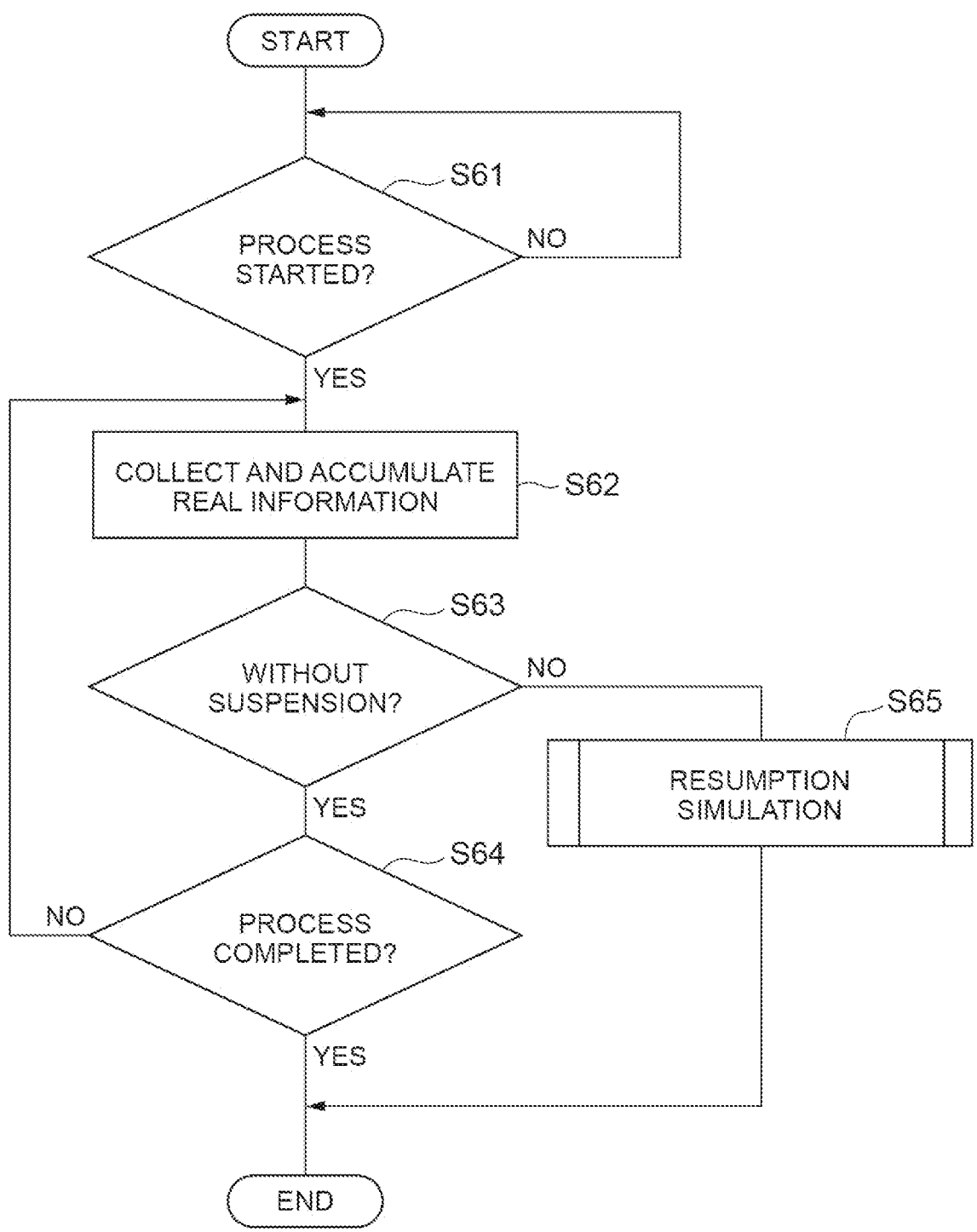
FIG. 24 is an example flowchart illustrating a real environment information collection procedure.

As shown in FIG. 24, the data management apparatus 300 first executes operations S61, S62, and S63. In operation S61, the real information collection unit 312 waits for the host controller 200 to start execution of the process corresponding to the production order. In operation S62, the real information collection unit 312 acquires real environment information from the environment information storage unit 215, acquires real progress information from the process storage unit 214, and stores a real data set in which the real environment information and the real progress information are associated with each other in the real information database 313. In operation S63, the real information collection unit 312 checks whether the operation suspension unit 219 suspends the operation of the plurality of local devices 2.

If it is determined in operation S63 that the operation suspension unit 219 does not suspend the operation of the plurality of local devices 2, the data management apparatus 300 performs operation S64. In operation S64, the real information collection unit 312 checks whether the execution of the process by the host controller 200 is completed.

If it is determined in operation S64 that the execution of the process by the host controller 200 is not completed, the data management apparatus 300 returns the process to operation S62. Thereafter, the data management apparatus 300 repeats the acquisition and accumulation of the real data set until the execution of the process by the host controller 200 is completed. If it is determined in operation S64 that the execution of the process by the host controller 200 is completed, the procedure for collecting real environment information is completed.

If it is determined in operation S63 that the operation suspension unit 219 suspends the operation of the plurality of local devices 2, the data management apparatus 300 executes a resumption simulation procedure (operation S65) described later.

Resumption Simulation Procedure

Figure 25:
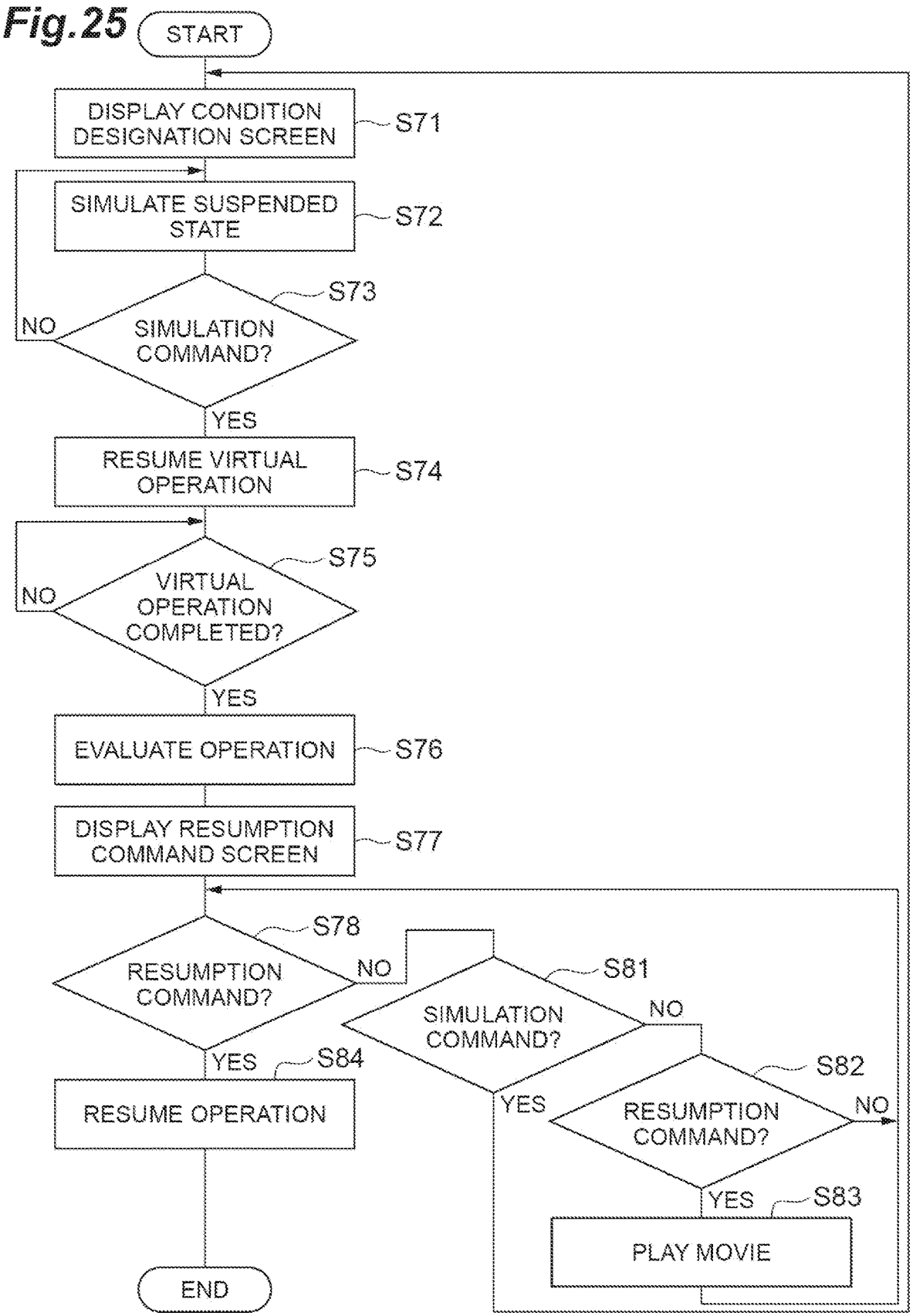
FIG. 25 is an example flowchart illustrating a resumption simulation procedure.

As shown in FIG. 25, the data management apparatus 300 first executes operations S71, S72, and S73. In operation S71, the simulation condition acquisition unit 327 displays the above-described simulation condition designation screen 370.

In operation S72, the suspend state simulation unit 321 stores a copy of the latest real environment information collected from the environment information storage unit 215 by the real information collection unit 312 and accumulated in the real information database 313 in the environment information storage unit 515 as the latest virtual environment information. The suspend state simulation unit 321 stores a copy of the latest real progress information collected from the process storage unit 214 by the real information collection unit 312 and accumulated in the real information database 313 in the process storage unit 514 as the latest virtual progress information.

In operation S73, the resumption simulator 322 checks whether or not a simulation instruction is input by the operation of the simulation instruction button 374.

If it is determined in operation S73 that no simulation command has been input, the data management apparatus 300 returns the process to operation S72. Thereafter, until a simulation command is input, the simulation of the state of the real space to the virtual space is repeated. Thus, the state of the virtual space is continuously adjusted to the latest state of the real space.

If it is determined in operation S73 that a simulation command has been input, the data management apparatus 300 executes operations S74, S75, S76, S77, and S78. In operation S74, the resumption simulator 322 causes the virtual controller 7 to resume the operation of the one or more virtual local devices 2v based on the operation program in response to the operational input to the simulation instruction button 374. In operation S75, the resumption evaluation unit 323 waits for the completion of the operation of one or more virtual local devices 2v.

In operation S76, after one or more virtual local devices 2v resume the operation, the resumption evaluation unit 323 interrupts the operation of the virtual local device 2v based on the virtual data set collected by the virtual information collection unit 314 and accumulated in the virtual information database 315. In operation S77, the resumption instruction acquisition unit 325 displays the resumption instruction screen 350 based on the evaluation result by the resumption evaluation unit 323. In operation S78, the operation resumption unit 326 checks whether or not the operation resumption instruction button 365 is operated.

If it is determined in operation S78 that the operation resumption instruction button 365 is not operated, the data management apparatus 300 executes operation S81. In operation S81, the resumption simulator 322 checks whether the resimulation instruction button 366 has been operated.

If it is determined in operation S81 that the resimulation instruction button 366 is not operated, the data management apparatus 300 executes operation S82. In operation S82, the resumption video playback unit 324 checks whether the playback instruction button 364 has been operated.

If it is determined in operation S82 that the playback instruction button 364 is not operated, the data management apparatus 300 returns the process to operation S78. Thereafter, the data management apparatus 300 waits for any one of the operation resumption instruction button 365, the resimulation instruction button 366, and the playback instruction button 364 to be operated.

If it is determined in operation S82 that the playback instruction button 364 is operated, the data management apparatus 300 executes operation S83. In operation S83, the resumption video playback unit 324 displays a video of the operation of one or more virtual local devices 2v in the video window 351 based on inputs to the mode selection unit 361, the resumption point designation unit 362, and the end point designation unit 363.

If it is determined in operation S81 that the resimulation instruction button 366 is operated, the data management apparatus 300 returns the process to operation S71. Accordingly, the simulation condition designation screen 370 is displayed again.

If it is determined in operation S78 that the operation resumption instruction button 365 is operated, the data management apparatus 300 executes operation S84. In operation S84, the operation resumption unit 326 outputs a resumption command for at least a part of the operations of the one or more local devices 2 based on the operation command after the resumption point designated by the resumption point designation unit 362 and before the end point designated by the end point designation unit 363 in the playback mode selected by the mode selection unit 361. This completes the resumption simulation procedure.

Operation Resumption Procedure by Host Controller

Figure 26:
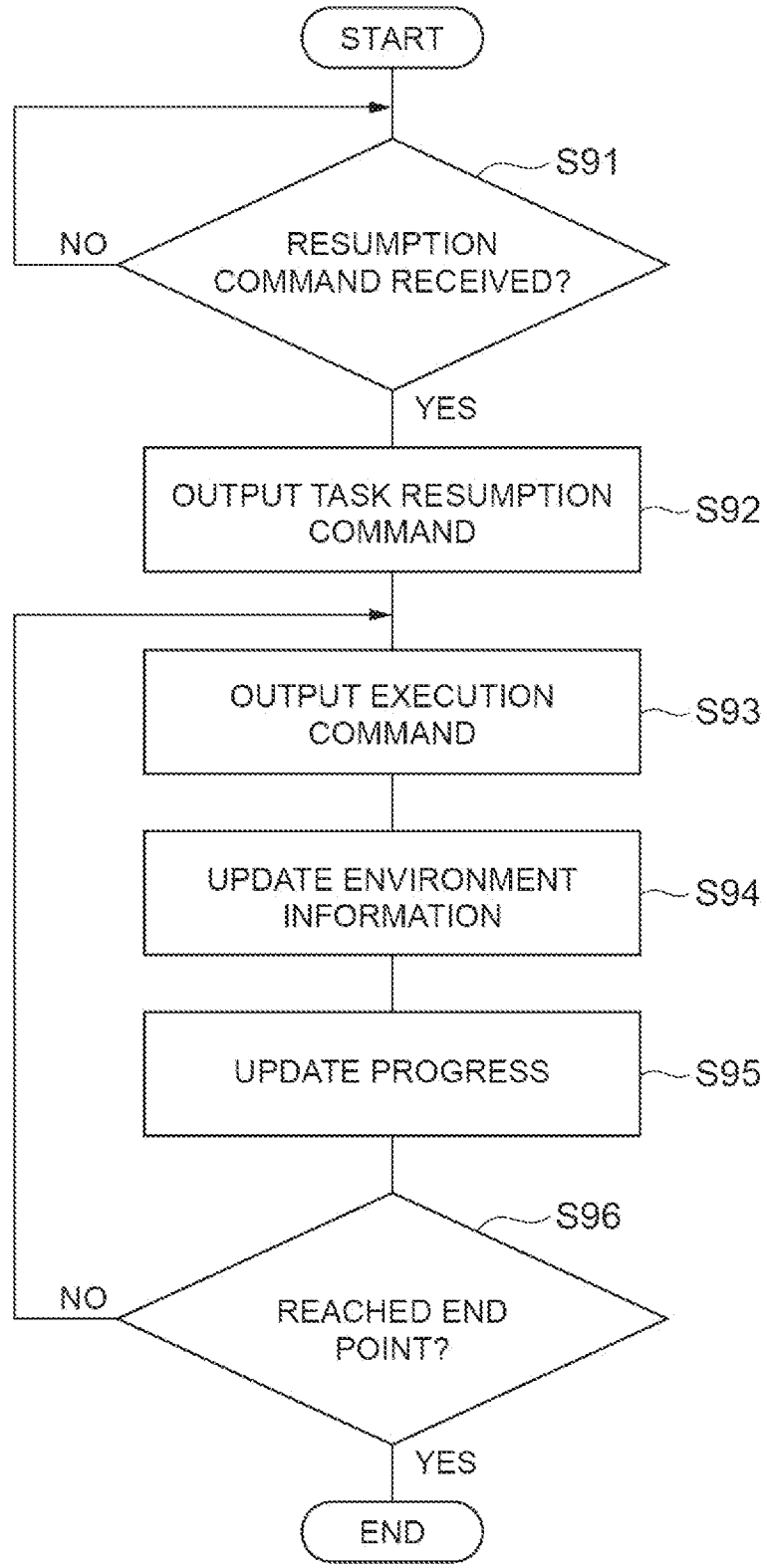
FIG. 26 is an example flowchart illustrating a control procedure by the host controller after an operation resume.

As shown in FIG. 26, the host controller 200 sequentially executes operations S91, S92, S93, S94, S95, and S96. In operation S91, the command output unit 216 waits for an operation resumption command. In operation S92, the command output unit 216 outputs a resumption command of the suspended task to the local controllers 100 of the one or more local devices 2 to be resumed. The local controller 100 having acquired the resumption command of the suspended task operates the responsible local device 2 to resume the suspended task.

In operation S93, the command output unit 216 outputs an execution command of the next task based on the process stored by the process storage unit 214, the progress information of the process, and the real environment information stored by the environment information storage unit 215. In operation S94, the environment update unit 218 acquires the status information of the local device 2 from each of the plurality of local controllers 100, acquires the detection result of the environmental sensor 5, and updates the environment information based on the status information and the detection result.

In operation S95, the progress update unit 217 updates the progress information of the process storage unit 214 in response to the task completion notification included in the status information acquired in operation S14. If the status information does not include a task completion notification, the progress information is not changed. In operation S96, the command output unit 216 checks whether the operation up to the end point designated by the resumption command has been completed.

If it is determined in operation S96 that the operation up to the end point has not been completed, the host controller 200 returns the process to operation S93. Thereafter, the operation of one or more local devices 2 that have resumed operation is continued until the end point is reached. If it is determined in operation S96 that the operation up to the end point is completed, the resumption procedure of the operation is completed.

As described above, the control system 3 includes: the controller 6 configured to operate the one or more robots 2B and 2C in real space based on the operation program; the virtual controller 7 configured to operate the one or more virtual robots 2Bv and 2Cv based on the operation program in a virtual space, the one or more virtual robots 2Bv and 2Cv corresponding to the one or more robots 2B and 2C respectively; the operation suspend unit 219 configured to cause the controller 6 to suspend an operation based on the operation program by the one or more robots 2B and 2C; the suspend state simulation unit 321 configured to simulate a suspended state of the real space after suspension of the operation by the one or more robots 2B and 2C, in the virtual space; and the resumption simulator 322 configured to cause the virtual controller 7 to resume at least a part of the operation by the one or more virtual robots 2Bv and 2Cv based on the operation program, in the virtual space in which the suspended state of the real space has been simulated.

If the one or more robots are in a state in which they can operate even after the operation of the one or more robots is suspended, it is desirable to immediately resume the operation of the one or more robots when the need for the operation suspend disappears, thereby minimizing the downtime of the system. However, when the operation of the one or more robots is suspended, there is a possibility that an unexpected change has occurred in the surrounding environment of the one or more robots.

On the other hand, according to the control system 3, the suspended state of the real space after suspension of the operations by the one or more robots 2B and 2C is simulated in the virtual space, and the operations of the one or more virtual robots 2Bv and 2Cv are resumed in the virtual space, so that it is possible to easily simulate when the operations of the one or more robots 2B and 2C are resumed in the real space. As a result, an event that occurs when the operation of one or more robots 2B and 2C is resumed can be quickly grasped prior to the actual operation resume. Therefore, it is effective for a quick response at the time of stopping the system.

The control system 3 may further include the environment information storage unit 215 configured to store real environment information representing the state of the real space, and the environment update unit 218 configured to update the real environment information stored in the environment information storage unit 215 according to the operation of the one or more robots 2B and 2C. The suspend state simulation unit 321 may be configured to simulate the suspended state in the virtual space based on the real environment information stored in the environment information storage unit 215. In this case, by updating the real environment information of the environment information storage unit 215 in real time during the operation of the one or more robots 2B and 2C, the state of the real space in which the operation of the one or more robots 2B and 2C is suspended can be quickly simulated to the virtual space.

The control system 3 may further include the resumption evaluation unit 323 configured to evaluate at least a part of the operation resumed by the one or more virtual robots 2Bv and 2Cv based on the predetermined evaluation conditions. In this case, based on the evaluation result, it is possible to allow the user to more accurately grasp an event that occurs when the operation by the one or more robots 2B and 2C is resumed. Therefore, the present disclosure is more effective in quick response to a system shutdown.

The control system 3 may further include the resumption video playback unit 324 configured to display a video of at least a part of the operation resumed by the one or more virtual robots 2Bv and 2Cv. In this case, by displaying the video of the operation by the one or more virtual robots 2Bv and 2Cv, it is possible to cause the user to more accurately grasp an event that occurs when the operation of the one or more robots 2B and 2C is resumed. Therefore, the present disclosure is more effective in quick response to a system shutdown.

The one or more robots 2B and 2C may include a plurality of robots 2B and 2C. The one or more virtual robots 2Bv and 2Cv may include a plurality of virtual robots 2Bv and 2Cv respectively corresponding to the plurality of robots 2B and 2C. The operation suspend unit 219 may be further configured to suspend the operation of the plurality of robots 2B and 2C in response to detecting an abnormality of any of the plurality of robots 2B and 2C. The resumption simulator 322 may be further configured to acquire operability information of each of the plurality of robots 2B and 2C that have suspended the operation from the controller 6, and resume at least a part of the operation by one or more operable virtual robots 2Bv and 2Cv corresponding to one or more robots 2B and 2C that are operable, while one or more inoperable virtual robots 2Bv and 2Cv corresponding to one or more robots 2B and 2C that are inoperable are at rest. The resumption evaluation unit 323 may be further configured to evaluate a presence or absence of a collision between the one or more inoperable virtual robots 2Bv and 2Cv and the one or more operable virtual robots 2Bv and 2Cv. In this case, it is possible to perform a flexible simulation based on the fact that there may be robots 2B and 2C that cannot resume operation. Therefore, the present disclosure is more effective in quick response to a system shutdown.

The control system 3 may further include the operation resumption unit 326 configured to cause the controller 6 to resume at least a part of the operation by the one or more robots 2B and 2C based on the evaluation result by the resumption evaluation unit 323. In this case, the operation by the one or more robots 2B and 2C can be appropriately resumed based on the evaluation result by the resumption evaluation unit 323.

The control system 3 may further include a resumption instruction acquisition unit 325 configured to display a resumption instruction screen 350 including an evaluation result by the resumption evaluation unit 323 and a resumption instruction input area 360. The operation resumption unit 326 may be configured to cause the controller 6 to resume at least a part of the operation by the one or more robots 2B and 2C based on the input to the resumption instruction input area 360. In this case, the operation of the one or more robots 2B and 2C can be more appropriately resumed based on the evaluation result by the resumption evaluation unit 323 and the user determination based on the evaluation result.

The operation program may include a plurality of time series operation commands. Resuming at least a part of the operation by the one or more robots 2B and 2C may include: a first mode resumption in which at least a part of the operation is resumed by the one or more robots 2B and 2C based on one or more operation commands positioned after a suspension point of the operation; and a second mode resumption in which at least a part of the operation is resumed by the one or more robots 2B and 2C based on one or more operation commands positioned before the suspension point of the operation. The resumption simulator 322 may be further configured to cause the virtual controller 7 to resume at least a part of the operation by the one or more virtual robots 2Bv and 2Cv for each of a plurality of resumption modes including the first mode and the second mode. The resumption evaluation unit 323 may be further configured to evaluate at least a part of the operation of the one or more virtual robots 2Bv and 2Cv for each of the plurality of resumption modes. The resumption instruction acquisition unit 325 may be further configured to display the resumption instruction screen 350 including an evaluation result for each of the plurality of resumption modes by the resumption evaluation unit 323 and the resumption instruction input area 360. The input to the resumption instruction input area 360 may include a selection input for selecting one of the plurality of resumption modes. The operation resumption unit 326 may be further configured to cause the controller 6 to resume at least a part of the operation by the one or more robots 2B and 2C based on the operation program in a resumption mode selected in the resumption instruction input area 360. In this case, it is possible to prompt an appropriate selection of any of the plurality of resumption modes based on the simulation result for each of the plurality of resumption modes. Therefore, the operations of the one or more robots 2B and 2C can be resumed more appropriately.

The operation program may include a plurality of time series operation commands. Resuming at least a part of the operation by the one or more robots 2B and 2C may include: a first mode resumption in which at least a part of the operation is resumed by the one or more robots 2B and 2C based on one or more operation commands positioned after a suspension point of the operation; and a second mode resumption in which at least a part of the operation is resumed by the one or more robots 2B and 2C based on one or more operation commands positioned before the suspension point of the operation. The control system 3 may further include the simulation condition acquisition unit 327 configured to display a simulation condition designation screen 370 including a mode selection area 371 for selecting a resumption mode from a plurality of resumption modes including the first mode and the second mode. The resumption simulator 322 may be further configured to cause the virtual controller 7 to resume the operation by the one or more virtual robots 2Bv and 2Cv in the resumption mode selected in the mode selection area 371. Also in this case, it is possible to prompt an appropriate selection of any of the plurality of resumption modes based on the simulation result for each resumption mode. In addition, by performing the simulation of the selected resumption mode after the mode selection by the user, the simulation result can be presented more quickly.

The operation program may include a plurality of time series operation commands. The resumption simulator 322 may be further configured to cause the virtual controller 7 to resume at least a part of the operation by one or more virtual robots 2Bv and 2Cv based on one or more operation commands positioned after the suspension point of the operation. In this case, the simulation can be easily executed.

The control system 3 may further include the simulation condition acquisition unit 327 that displays the simulation condition designation screen 370 including the start point designation area 372 for designating a simulation start point in the operation program. The resumption simulator 322 may cause the virtual controller 7 to resume at least a part of the operation by the one or more virtual robots 2Bv and 2Cv based on one or more operation commands positioned after the designated simulation start point. In this case, even when the user desires to adjust the operation resumption point, flexible simulation can be performed.

The control system 3 may further include the simulation condition acquisition unit 327 configured to display a simulation condition designation screen 370 including the end point designation area 373 for designating a simulation end point in the operation program. The resumption simulator 322 may be configured to cause the virtual controller 7 to resume at least a part of the operation of the one or more virtual robots 2Bv and 2Cv based on one or more operation commands positioned before the designated simulation end point. In this case, even when the user desires to adjust the operation end point after resuming, flexible simulation corresponding to the case can be performed.

The resumption evaluation unit 323 may be configured to calculate, for each of the one or more robots 2B and 2C, an operable period after resuming the operation based on at least a part of the operation resumed by the one or more virtual robots 2Bv and 2Cv. The resumption instruction acquisition unit 325 may be further configured to display a resumption instruction screen 350 including an operable period for each of the one or more robots 2B and 2C and a resumption instruction input area 360. The input to the resumption instruction input area 360 may include a designation input for designating a resumption point. The operation resumption unit 326 may be further configured to cause the controller 6 to resume at least a part of the operation by the one or more robots 2B and 2C based on one or more operation command positioned after the designated resumption point. In this case, by presenting an operable period and a resumption instruction input area capable of designating a resumption point, it is possible to prompt an appropriate input of the resumption point.

The resumption evaluation unit 323 may be configured to calculate, for each of the one or more robots 2B and 2C, an operable period after resuming the operation based on at least a part of the operation by the one or more virtual robots 2Bv and 2Cv. The resumption instruction acquisition unit 325 may be configured to display a resumption instruction screen 350 including an operable period for each of the one or more robots 2B and 2C and a resumption instruction input area 360. The input to the resumption instruction input area 360 may include a designation input for designating an end point. The operation resumption unit 326 may be configured to cause the controller 6 to resume at least a part of the operation by the one or more robots 2B and 2C based on one or more operation commands positioned before the designated resumption point. In this case, by presenting an operable period and a resumption instruction input area 360 capable of designating an end point, it is possible to prompt appropriate input of an end point.

The control system 3 may further include the peripheral information storage unit 328 configured to store peripheral behavior information indicating how another machine operates after suspension of the operation by the two or more robots 2B and 2C. The resumption evaluation unit 323 may be configured to evaluate at least a part of the operation by one or more virtual robots 2Bv and 2Cv based on the peripheral behavior information. In this case, more appropriate simulation can be performed in consideration of the operation of the other machine.

The control system 3 may further include an environmental sensor 5 configured to detect the state of the real space. The suspend state simulation unit 321 may be further configured to simulate the suspended state of the real space in the virtual space based on the detection result by the environmental sensor 5. In this case, more appropriate simulation can be performed by simulating the real space in the virtual space with higher accuracy.

The suspend state simulation unit 321 may be further configured to simulate the suspended state of the real space in the virtual space, further based on the status information of the one or more robots 2B and 2C stored in the controller 6. In this case, more appropriate simulation can be performed by simulating real space with virtual space with higher accuracy.

The operation suspension unit 219 may be further configured to suspend the operation of the one or more robots 2B and 2C by the controller 6 in response to detecting that a difference between the state of the real space during the operation by the one or more robots 2B and 2C and the state of the virtual space during the operation by the one or more virtual robots 2Bv and 2Cv. In this case, by comparing the real environment information of the real space with the virtual environment information of the virtual space, it is possible to quickly suspend the operation of the one or more robots 2B and 2C with respect to the occurrence of abnormality in the real space.

The control system 3 may further include a program generation unit 332 configured to repeat: operating the one or more virtual robots 2Bv and 2Cv based on the operation program by the virtual controller 7; and modifying the operation program based on the state of the virtual space during the operation by the one or more virtual robots 2Bv and 2Cv. The controller 6 may be further configured to operate the one or more robots 2B and 2C based on the operation program modified by the program generation unit 332. In this case, the simulation by the virtual robots 2Bv and 2Cv and the virtual controller 7 can be effectively used for correcting the operation program.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coining within the spirit and scope of the subject matter claimed herein.

What is claimed is:

1. A control system comprising:
    a controller configured to operate one or more robots in a real space based on an operation program, the operation program including a plurality of time series operation commands; and
    circuitry configured to:
        operate one or more virtual robots based on the operation program in a virtual space, the one or more virtual robots corresponding to the one or more robots respectively;
        cause the controller to suspend an operation of the one or more robots based on the operation program;
        simulate a suspended state of the real space after suspension of the operation of the one or more robots, in the virtual space; and
        resume at least part of the operation of the one or more virtual robots based on one or more operation commands positioned, in the plurality of time series operation commands, after a suspension point of the operation program, wherein the operation is resumed in the virtual space in which the suspended state of the real space has been simulated.

2. The control system according to claim 1, wherein the circuitry is further configured to:
    update real environment information stored in an environment information storage according to the operation of the one or more robots, the environment information representing a state of the real space; and
    simulate the suspended state in the virtual space based on the real environment information stored in the environment information storage.

3. The control system according to claim 1, wherein the circuitry is further configured to evaluate the at least part of the operation of the one or more virtual robots resumed by the circuitry based on a predetermined evaluation condition.

4. The control system according to claim 3, wherein the circuitry is further configured to graphically display a video of the at least part of the operation of the one or more virtual robots resumed by the circuitry.

5. The control system according to claim 3, wherein the one or more robots include a plurality of robots,
    wherein the one or more virtual robots include a plurality of virtual robots respectively corresponding to the plurality of robots, and
    wherein the circuitry is further configured to:
        suspend the operation of the plurality of robots in response to detecting an abnormality of any of the plurality of robots;
        acquire operability information of each of the plurality of robots that have suspended the operation from the controller, and resume at least part of the operation of one or more operable virtual robots of the plurality of virtual robots corresponding to one or more operable robots of the plurality of robots, while one or more inoperable virtual robots of the plurality of virtual robots corresponding to one or more inoperable robots of the plurality of robots are at rest; and
        evaluate a presence or absence of a collision between the one or more inoperable virtual robots and the one or more operable virtual robots.

6. The control system according to claim 3, wherein the circuitry is further configured to cause the controller to resume the at least part of the operation of the one or more robots based on an evaluation result of the operation of the one or more virtual robots resumed by the circuitry.

7. The control system according to claim 6, wherein the circuitry is further configured to:
    display a resumption instruction screen including the evaluation result of the operation of the one or more virtual robots resumed by the circuitry and a resumption instruction input area; and
    cause the controller to resume the at least part of the operation of the one or more robots based on an input to the resumption instruction input area.

8. The control system according to claim 7,
    wherein resuming the at least part of the operation of the one or more robots includes:
        a first mode resumption in which at least a first part of the operation of the one or more robots is resumed based on one or more operation commands positioned after the suspension point of the operation; and
        a second mode resumption in which at least a second part of the operation of the one or more robots is resumed based on one or more operation commands positioned before the suspension point of the operation, wherein the circuitry is further configured to:
    resume the first part or the second part of the operation of the one or more virtual robots for each of a plurality of resumption modes including the first mode and the second mode;
    evaluate the first part or the second part of the operation of the one or more virtual robots for each of the plurality of resumption modes;
    display the resumption instruction screen including:
        an evaluation result of the operation of the one or more virtual robots for each of the plurality of resumption modes; and
        the resumption instruction input area, wherein the input to the resumption instruction input area includes a selection input for selecting one of the plurality of resumption modes; and
    cause the controller to resume the first part or the second part of the operation of the one or more robots based on the operation program in a resumption mode selected in the resumption instruction input area.

9. The control system according to claim 3,
wherein resuming the at least part of the operation of the one or more robots includes:
  a first mode resumption in which at least a first part of the operation of the one or more robots is resumed based on one or more operation commands positioned after the suspension point of the operation; and
  a second mode resumption in which at least a second part of the operation of the one or more robots is resumed based on one or more operation commands positioned before the suspension point of the operation, and wherein the circuitry is further configured to:
    display a simulation condition designation screen including a selection area for selecting a resumption mode from a plurality of resumption modes including the first mode and the second mode; and
    resume the operation of the one or more virtual robots in the resumption mode selected in the selection area.

10. The control system according to claim 1, wherein the circuitry is further configured to:
  display a simulation condition designation screen including a designation area for designating a simulation start point in the operation program; and
  resume the at least part of the operation of the one or more virtual robots based on one or more operation commands positioned after the designated simulation start point.

11. The control system according to claim 1, wherein the circuitry is further configured to:
  display a simulation condition designation screen including a designation area for designating a simulation end point in the operation program; and
  resume the at least part of the operation of the one or more virtual robots based on one or more operation commands positioned before the designated simulation end point.

12. The control system according to claim 7, wherein the circuitry is further configured to:
  calculate, for each of the one or more robots, an operable period after resuming the operation, based on the at least part of the operation of the one or more virtual robots;
  display the resumption instruction screen including the operable period for each of the one or more robots and the resumption instruction input area, wherein the input to the resumption instruction input area includes a designation input for designating a resumption point; and
  cause the controller to resume the at least part of the operation of the one or more robots based on one or more operation commands positioned after the designated resumption point.

13. The control system according to claim 7, wherein the circuitry is further configured to:
  calculate, for each of the one or more robots, an operable period after resuming the operation, based on the at least part of the operation of the one or more virtual robots;
  display the resumption instruction screen including the operable period for each of the one or more robots and the resumption instruction input area, wherein the input to the resumption instruction input area includes a designation input for designating an end point; and
  cause the controller to resume the at least part of the operation of the one or more robots based on one or more operation commands positioned before the designated end point.

14. The control system according to claim 3, wherein the circuitry is further configured to:
  store peripheral behavior information indicating how another machine operates after suspension of the operation of the one or more robots; and
  evaluate the at least part of the operation of the one or more virtual robots further based on the peripheral behavior information.

15. The control system according to claim 1, further comprising an environmental sensor configured to detect a state of the real space, and
  wherein the circuitry is further configured to simulate the suspended state of the real space in the virtual space based on a detection result by the environmental sensor.

16. The control system according to claim 15, wherein the circuitry is further configured to simulate the suspended state of the real space in the virtual space, further based on a status information of the one or more robots stored in the controller.

17. The control system according to claim 1, wherein the circuitry is further configured to suspend the operation of the one or more robots by the controller in response to detecting a difference between a state of the real space during the operation of the one or more robots and a state of the virtual space during the operation by the one or more virtual robots.

18. The control system according to claim 1, wherein the circuitry is further configured to:
  repeat a number of operations comprising:
    operating the one or more virtual robots based on the operation program; and
    modifying the operation program based on a state of the virtual space during the operation of the one or more virtual robots; and
  operate the one or more robots based on the modified operation program.

19. A robot system, comprising:
  the control system according to claim 1; and
  the one or more robots.

20. A control method comprising:
  operating one or more robots in a real space based on an operation program, the operation program including a plurality of time series operation commands;
  suspending an operation based on the operation program of the one or more robots;
  simulating a suspended state of the real space after suspension of the operation of the one or more robots in a virtual space; and
  resuming at least part of the operation of one or more virtual robots based on one or more operation commands positioned, in the plurality of time series operation commands, after a suspension point of the operation program, wherein the operation is resumed in the virtual space in which the suspended state of the real space is simulated.

21. The control method according to claim 20, further comprising:
  displaying a resumption instruction screen including an evaluation result of the operation of the one or more virtual robots and a resumption instruction input area; and resuming the at least part of the operation of the one or more robots based on an input to the resumption instruction input area.

\* \* \* \* \*